United States Patent
Berthier et al.

(10) Patent No.: US 12,508,565 B2
(45) Date of Patent: Dec. 30, 2025

(54) POLYAMIDE MICROCAPSULES

(71) Applicant: Firmenich SA, Satigny (CH)

(72) Inventors: Damien Berthier, Satigny (CH);
Andreas Herrmann, Satigny (CH);
Serge Lamboley, Satigny (CH);
Lahoussine Ouali, Satigny (CH);
Nicolas Paret, Satigny (CH)

(73) Assignee: FIRMENICH SA, Satigny (CH)

( * ) Notice: Subject to any disclaimer, the term of this patent is extended or adjusted under 35 U.S.C. 154(b) by 765 days.

(21) Appl. No.: 17/802,518

(22) PCT Filed: Jun. 14, 2021

(86) PCT No.: PCT/EP2021/065900
§ 371 (c)(1),
(2) Date: Aug. 25, 2022

(87) PCT Pub. No.: WO2021/254931
PCT Pub. Date: Dec. 23, 2021

(65) Prior Publication Data
US 2023/0105666 A1 Apr. 6, 2023

(30) Foreign Application Priority Data

Jun. 16, 2020 (EP) .................................... 20180371

(51) Int. Cl.
*A61K 8/88* (2006.01)
*B01J 13/16* (2006.01)
*C11B 9/00* (2006.01)

(52) U.S. Cl.
CPC ................ *B01J 13/16* (2013.01); *C11B 9/00* (2013.01)

(58) Field of Classification Search
CPC .. A23L 27/72; A61K 8/88; A61K 8/11; A61K 2800/412; C11B 9/00; A61Q 13/00; A01N 25/28; B01J 13/22; B01J 13/16; C11D 3/505
USPC ........................................... 512/4, 1
See application file for complete search history.

(56) References Cited

U.S. PATENT DOCUMENTS

| 2012/0152268 A1* | 6/2012 | York | B01J 13/16 |
| | | | 510/438 |
| 2022/0152571 A1* | 5/2022 | Ouali | B01J 13/16 |

FOREIGN PATENT DOCUMENTS

| EP | 2 468 239 A1 | 6/2012 |
| GB | 2 016 925 A | 10/1979 |
| JP | H04 219133 A | 8/1992 |

* cited by examiner

*Primary Examiner* — Jessica Whiteley
(74) *Attorney, Agent, or Firm* — Armstrong Teasdale LLP

(57) ABSTRACT

The present invention relates to polyamide microcapsules. A process for the preparation of polyamide microcapsules is also an object of the invention. Perfuming compositions and consumer products comprising said microcapsules, in particular perfumed consumer products in the form of home care or personal care products, are also part of the invention.

19 Claims, No Drawings

POLYAMIDE MICROCAPSULES

This present application is a U.S. national phase entry under 35 U.S.C. § 371 of PCT Application No. PCT/EP2021/065900, filed Jun. 14, 2021, which claims priority to European Patent Application No. 20180371.5, filed Jun. 16, 2020. The entire contents of these applications are explicitly incorporated herein by this reference.

TECHNICAL FIELD

The present invention relates to polyamide microcapsules. A process for the preparation of polyamide microcapsules is also an object of the invention. Perfuming compositions and consumer products comprising said microcapsules, in particular perfumed consumer products in the form of home care or personal care products, are also part of the invention.

BACKGROUND OF THE INVENTION

One of the problems faced by the perfumery industry lies in the relatively rapid loss of olfactive benefit provided by odoriferous compounds due to their volatility, particularly that of "top-notes". In order to tailor the release rates of volatiles, delivery systems, such as microcapsules containing a perfume, are needed to protect and later release the core payload when triggered. A key requirement from the industry regarding these systems is to survive suspension in challenging bases without physically dissociating or degrading. This is referred to as stability of the delivery system. For instance, fragranced personal and household cleansers containing high levels of aggressive surfactant detergents are very challenging for the stability of microcapsules.

Polyurea and polyurethane-based microcapsule slurries are widely used, for example in the perfumery industry, as they provide a long-lasting pleasant olfactory effect after their application on different substrates. Those microcapsules have been widely disclosed in the prior art (see for example WO 2007/004166 or EP 2300146 from the Applicant).

There is still a need to provide new microcapsules, while not compromising on the performance of the microcapsules, in particular in terms of stability in a challenging medium such as a consumer product base, as well as in delivering a good performance in terms of active ingredient delivery, e.g. olfactive performance in the case of perfuming ingredients.

The present invention is proposing a solution to the above-mentioned problem by providing new polyamide microcapsules and a process for preparing said microcapsules.

SUMMARY OF THE INVENTION

It has now been found that core-shell microcapsules encapsulating hydrophobic material could be obtained by reacting an acyl chloride as defined in the present invention with at least one amino compound during the preparation process.

A first object of the invention is a polyamide core-shell microcapsule comprising:
  an oil-based core comprising a hydrophobic material, preferably a perfume, and
  a polyamide shell comprising:
    at least one acyl chloride, and
    at least one amino compound, wherein the acyl chloride has the following formula (I)

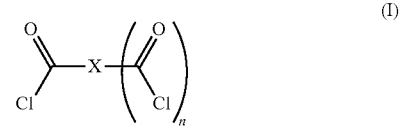

wherein n is an integer varying between 1 and 8, preferably between 1 and 6, more preferably between 1 and 4, and
wherein X is either an (n+1)-valent $C_3$ to $C_6$ alkyl group, or an (n+1)-valent $C_2$ to $C_{45}$ hydrocarbon group comprising at least one group selected from (i) to (vi),

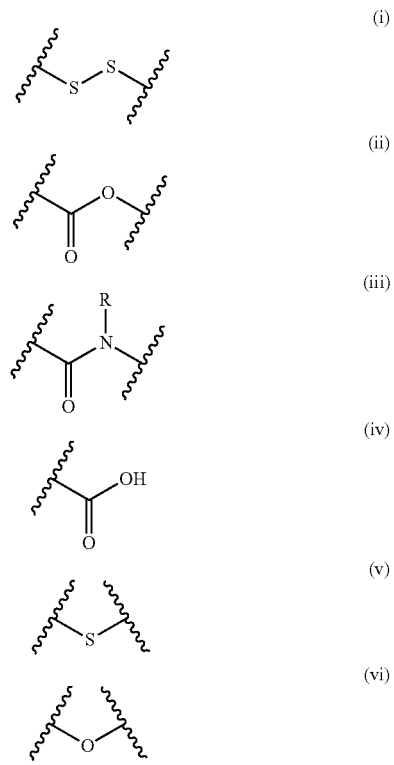

wherein R is a hydrogen atom or a methyl or ethyl group, preferably a hydrogen atom, with the proviso that cyclohexane-1,3,5-tricarbonyl trichloride and 2,2'-oxydiacetyl chloride are excluded.

In a second aspect, the present invention relates to a process for preparing a polyamide core-shell microcapsule slurry comprising the following steps:
  a) Dissolving at least one acyl chloride in a hydrophobic material, preferably a perfume to form an oil phase;
  b) Dispersing the oil phase obtained in step a) into a water phase to obtain an oil-in-water emulsion;
  c) Performing a curing step to form polyamide microcapsules in the form of a slurry;
  wherein a stabilizer is added to the oil phase and/or to the water phase, and
  wherein at least one amino-compound is added to the water phase before the formation of the oil-in-water emulsion and/or in the oil-in water emulsion obtained after step b)

wherein the acyl chloride has the following formula (I)

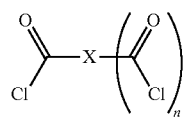
(I)

wherein n is an integer varying between 1 and 8, preferably between 1 and 6, more preferably between 1 and 4, and wherein X is either an (n+1)-valent $C_3$ to $C_6$ alkyl group, or an (n+1)-valent $C_2$ to $C_{45}$ hydrocarbon group comprising at least one group selected from (i) to (vi),

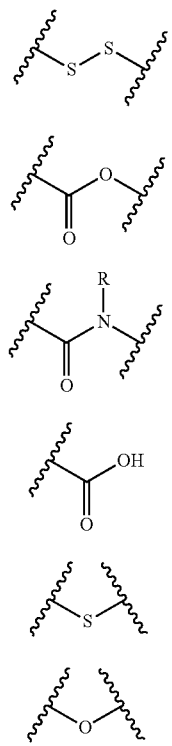

wherein R is a hydrogen atom or a methyl or ethyl group, preferably a hydrogen atom, with the proviso that cyclohexane-1,3,5-tricarbonyl trichloride and 2,2'-oxydiacetyl chloride are excluded.

A third object of the invention is a polyamide core-shell microcapsule slurry obtainable by the process as defined above.

A perfuming composition comprising:
(i) microcapsules as defined above, wherein the hydrophobic material comprises a perfume,
(ii) at least one ingredient selected from the group consisting of a perfumery carrier and a perfumery base
(iii) optionally at least one perfumery adjuvant
is another object of the invention.

Another object of the invention is a consumer product comprising:
a personal care active base, and
microcapsules as defined above or the perfuming composition as defined above,
wherein the consumer product is in the form of a personal care composition.

Another object of the invention is a consumer product comprising:
a home care or a fabric care active base, and
microcapsules as defined above or the perfuming composition as defined above,
wherein the consumer product is in the form of a home care or a fabric care composition.

DETAILED DESCRIPTION OF THE INVENTION

Unless stated otherwise, percentages (%) are meant to designate a percentage by weight of a composition.

By "active ingredient", it is meant a single compound or a combination of ingredients.

By "perfume or flavor oil", it is meant a single perfuming or flavoring compound or a mixture of several perfuming or flavoring compounds.

By "consumer product" or "end-product" it is meant a manufactured product ready to be distributed, sold and used by a consumer.

For the sake of clarity, by the expression "dispersion" in the present invention it is meant a system in which particles are dispersed in a continuous phase of a different composition and it specifically includes a suspension or an emulsion.

By "microcapsule", or the similar, in the present invention is meant a core-shell microcapsule with a particle size distribution in the micron range (e.g. a mean diameter (d(v, 0.5)) comprised between about 1 and 3000 microns) and comprising an external solid polymer-based shell and an internal continuous oil phase enclosed by the external shell.

By "microcapsule slurry", it is meant microcapsule(s) that is (are) dispersed in a liquid. According to an embodiment, the slurry is an aqueous slurry, i.e the microcapsule(s) is (are) dispersed in an aqueous phase.

By "amino-compound" it should be understood a compound having at least two reactive amine groups.

In the present invention, the terms "acyl chloride" and "acid chloride" are used indifferently.

In the present invention, the terms "2,2'-oxydiacetyl chloride" and "diglycolyl chloride" are used indifferently.

By "polyamide microcapsules", it is meant that the microcapsule's shell comprises a polyamide material made of a reaction product between an acyl chloride and at least one amino compound with optionally a stabilizer. The wording "polyamide microcapsules" can also encompass a shell made of a composite comprising a polyamide material and another material, for example a biopolymer.

Polyamide Microcapsules

An object of the invention is a polyamide core-shell microcapsule comprising:
an oil-based core comprising a hydrophobic material, preferably a perfume, and
a polyamide shell comprising:
at least one acyl chloride
at least one amino compound,
wherein the acyl chloride has the following formula (I)

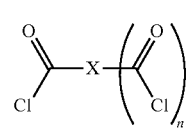
(I)

wherein n is an integer varying between 1 and 8, preferably between 1 and 6, more preferably between 1 and 4, and wherein X is either an (n+1)-valent $C_3$ to $C_6$ alkyl group, or an (n+1)-valent $C_2$ to $C_{45}$ hydrocarbon group comprising at least one group selected from (i) to (vi),

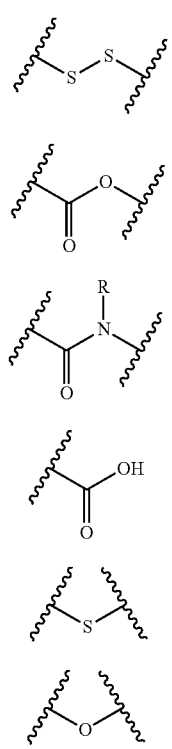

wherein R is a hydrogen atom or a methyl or ethyl group, preferably a hydrogen atom, with the proviso that cyclohexane-1,3,5-tricarbonyl trichloride and 2,2'-oxydiacetyl chloride are excluded.

Another object of the invention is a polyamide core-shell microcapsule slurry comprising at least one polyamide core-shell microcapsule microcapsule as defined above.

According to an embodiment, if the hydrocarbon group X comprises several groups selected from (i) to (vi), they are each separated by at least one carbon atom of X.

It is understood that by " . . . hydrocarbon group . . . " it is meant that said group consists of hydrogen and carbon atoms and can be in the form of an aliphatic hydrocarbon, i.e. linear or branched saturated hydrocarbon (e.g. alkyl group), a linear or branched unsaturated hydrocarbon (e.g. alkenyl or alkynyl group), a saturated cyclic hydrocarbon (e.g. cycloalkyl) or an unsaturated cyclic hydrocarbon (e.g. cycloalkenyl or cycloalkynyl), or can be in the form of an aromatic hydrocarbon, i.e. aryl group, or can also be in the form of a mixture of said type of groups, e.g. a specific group may comprise a linear alkyl, a branched alkenyl (e.g. having one or more carbon-carbon double bonds), a (poly)cycloalkyl and an aryl moiety, unless a specific limitation to only one type is mentioned. Similarly, in all the embodiments of the invention, when a group is mentioned as being in the form of more than one type of topology (e.g. linear, cyclic or branched) and/or being saturated or unsaturated (e.g. alkyl, aromatic or alkenyl), it is also meant a group which may comprise moieties having any one of said topologies or being saturated or unsaturated, as explained above. Similarly, in all the embodiments of the invention, when a group is mentioned as being in the form of one type of saturation or unsaturation, (e.g. alkyl), it is meant that said group can be in any type of topology (e.g. linear, cyclic or branched) or having several moieties with various topologies.

It is understood that with the term " . . . a hydrocarbon group, possibly comprising . . . " it is meant that said hydrocarbon group optionally comprises heteroatoms to form ether, thioether, amine, nitrile or carboxylic acid groups and derivatives (including for example esters, acids, amide).

These groups can either substitute a hydrogen atom of the hydrocarbon group and thus be laterally attached to said hydrocarbon, or substitute a carbon atom (if chemically possible) of the hydrocarbon group and thus be inserted into the hydrocarbon chain or ring.

According to an embodiment, when group (vi) is present, it is only present in combination with either one of groups (i) to (v).

According to a particular embodiment, the acyl chloride is chosen from the group consisting of propane-1,2,3-tricarbonyl trichloride, cyclohexane-1,2,4,5-tetracarbonyl tetrachloride, 2,2'-disulfanediyldisuccinyl dichloride, 2-(2-chloro-2-oxo-ethyl)sulfanylbutanedioyl dichloride, (4-chloro-4-oxobutanoyl)-L-glutamoyl dichloride, (S)-4-((1,5-dichloro-1,5-dioxopentan-2-yl)amino)-4-oxobutanoic acid, 2,2-bis[(4-chloro-4-oxo-butanoyl)oxymethyl]butyl 4-chloro-4-oxo-butanoate, [2-[2,2-bis[(4-chloro-4-oxo-butanoyl)oxymethyl]butoxymethyl]-2-[(4-chloro-4-oxo-butanoyl)oxymethyl]butyl] 4-chloro-4-oxo-butanoate, 2,2-bis[(2-chlorocarbonylbenzoyl)oxymethyl]butyl 2-chlorocarbonyl-benzoate, [2-[2,2-bis[(2-chlorocarbonylbenzoyl)oxymethyl]butoxymethyl]-2-[(2-chlorocarbonylbenzoyl)oxymethyl]butyl] 2-chlorocarbonylbenzoate, 4-(2,4,5-trichlorocarbonylbenzoyl)oxybutyl 2,4,5-trichlorocarbonyl-benzoate, and mixtures thereof.

By "a polyamide shell comprising at least one acyl chloride and at least one amino compound", it should be understood that the polyamide shell is derived from at least one acyl chloride and at least one amino compound. In other words, it should be understood that the polyamide shell comprises the reaction product of at least one acyl chloride with at least one amino compound.

According to an embodiment, when a stabilizer is present in the shell, it should be understood that the polyamide shell is derived from an acyl chloride, at least one amino-compound and a stabilizer. In other words, according to this embodiment, it should be understood that the polyamide shell comprises the reaction product of an acyl chloride with at least one amino-compound and a stabilizer.

The weight ratio between acyl chloride and the hydrophobic material is preferably comprised between 0.01 and 0.2, preferably between 0.01 and 0.09, more preferably between 0.03 and 0.07.

According to an embodiment, the molar ratio between the functional group $NH_2$ of the amino compound and the functional group COCl of the acyl chloride is comprised between 0.01 and 50, preferably between 0.01 and 20, more preferably between 0.01 and 10.

According to a particular embodiment, the acyl chloride of the present invention is a mixture of at least two different acyl chlorides defined in formula (I).

According to a particular embodiment, the acyl chloride of the present invention defined in formula (I) can be used in combination with another acyl chloride, particularly chosen from the group consisting of benzene-1,3,5-tricarbonyl chloride, benzene-1,2,4-tricarbonyl trichloride, benzene-1, 2,4,5-tetracarbonyl tetrachloride, cyclohexane-1,3,5-tricarbonyl trichloride, isophthalyol dichloride, 2,2'-oxydiacetyl chloride (diglycolyl dichloride), succinic dichloride, and mixtures thereof.

Hydrophobic Material

According to an embodiment, the hydrophobic material is a hydrophobic active ingredient. According to a preferred embodiment, the active ingredient comprises a perfume oil or a flavor oil. Alternative ingredients which could benefit from being encapsulated could be used either instead of a perfume or flavor, or in combination with a perfume or flavor. Non-limiting examples of such ingredients include a cosmetic, skin caring, malodour counteracting, bactericide, fungicide, pharmaceutical or agrochemical ingredient, a sanitizing agent, an insect repellent or attractant, and a mixture thereof.

The nature and type of the insect repellent or attractant that can be present in the hydrophobic internal phase does not warrant a more detailed description here, which in any case would not be exhaustive, the skilled person being able to select them on the basis of its general knowledge and according to the intended use or application.

Examples of such insect repellent or attractant are birch, DEET (N,N-diethyl-m-toluamide), essential oil of the lemon eucalyptus (*Corymbia citriodora*) and its active compound p-menthane-3,8-diol (PMD), icaridin (hydroxyethyl isobutyl piperidine carboxylate), Nepelactone, Citronella oil, Neem oil, Bog Myrtle (*Myrica gale*), Dimethyl carbate, Tricyclodecenyl allyl ether, IR3535 (3-[N-Butyl-N-acetyl]-aminopropionic acid, ethyl ester, Ethylhexanediol, Dimethyl phthalate, Metofluthrin, Indalone, SS220, anthranilate-based insect repellents, and mixtures thereof.

By "perfume" (or also "perfume oil") it is meant here an ingredient or composition that is a liquid at about 20° C. According to any one of the above embodiments said perfume oil can be a perfuming ingredient alone or a mixture of ingredients in the form of a perfuming composition. By "perfuming ingredient" it is meant here a compound, which is used for the primary purpose of conferring or modulating an odor. In other words, such an ingredient, to be considered as being a perfuming one, must be recognized by a person skilled in the art as being able to at least impart or modify in a positive or pleasant way the odor of a composition, and not just as having an odor. For the purpose of the present invention, a perfume oil also includes combinations of perfuming ingredients with substances which together improve, enhance or modify the delivery of the perfuming ingredients, such as perfume precursors, emulsions or dispersions, as well as combinations which impart an additional benefit beyond that of modifying or imparting an odor, such as long-lasting, blooming, malodor counteraction, antimicrobial effect, microbial stability, pest control.

The nature and type of the perfuming ingredients present in the oil phase do not warrant a more detailed description here, which in any case would not be exhaustive, the skilled person being able to select them on the basis of their general knowledge and according to intended use or application and the desired organoleptic effect. In general terms, these perfuming ingredients belong to chemical classes as varied as alcohols, lactones, aldehydes, ketones, esters, ethers, acetates, nitriles, thiols, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery.

In particular one may cite perfuming ingredients which are commonly used in perfume formulations, such as:

Aldehydic ingredients: decanal, dodecanal, 2-methyl-undecanal, 10-undecenal, octanal, nonanal and/or nonenal;

Aromatic-herbal ingredients: eucalyptus oil, camphor, eucalyptol, 5-methyltricyclo[6.2.1.0-2,7-]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;

Balsamic ingredients: coumarin, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4 (2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S}-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)-[1-(3',3'-dimethyl-1'-cyclohexyl)ethoxycarbonyl]methyl propanoate, Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2,7}$]undec[4]ene, (1-ethoxyethoxy)cyclododecane, 2,2,9,11-tetramethylspiro[5.5]undec-8-en-1-yl acetate, 1-(octahydro-2,3,8,8-tetramethyl-2-naphtalenyl)-1-ethanone, patchouli oil, terpenes fractions of patchouli oil, clearwood®, (1'R,E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b]furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

According to a particular embodiment, the perfuming ingredients have a high steric hindrance and are chosen in particular from the following groups:

Group 1: perfuming ingredients comprising a cyclohexane, cyclohexene, cyclohexanone or cyclohexenone ring substituted with at least one linear or branched $C_1$ to $C_4$ alkyl or alkenyl substituent;

Group 2: perfuming ingredients comprising a cyclopentane, cyclopentene, cyclopentanone or cyclopentenone ring substituted with at least one linear or branched $C_4$ to $C_8$ alkyl or alkenyl substituent;

Group 3: perfuming ingredients comprising a phenyl ring or perfuming ingredients comprising a cyclohexane, cyclohexene, cyclohexanone or cyclohexenone ring substituted with at least one linear or branched $C_5$ to $C_8$ alkyl or alkenyl substituent or with at least one phenyl substituent and optionally one or more linear or branched $C_1$ to $C_3$ alkyl or alkenyl substituents;

Group 4: perfuming ingredients comprising at least two fused or linked $C_5$ and/or $C_6$ rings;

Group 5: perfuming ingredients comprising a camphor-like ring structure;

Group 6: perfuming ingredients comprising at least one $C_7$ to $C_{20}$ ring structure;

Group 7: perfuming ingredients having a logP value above 3.5 and comprising at least one tert-butyl or at least one trichloromethyl substitutent;

Examples of ingredients from each of these groups are:

Group 1: 2,4-dimethyl-3-cyclohexene-1-carbaldehyde (origin: Firmenich SA, Geneva, Switzerland), isocyclocitral, menthone, isomenthone, methyl 2,2-dimethyl-6-methylene-1-cyclohexanecarboxylate (origin: Firmenich SA, Geneva, Switzerland), nerone, terpineol, dihydroterpineol, terpenyl acetate, dihydroterpenyl acetate, dipentene, eucalyptol, hexylate, rose oxide, (S)-1,8-p-menthadiene-7-ol (origin: Firmenich SA, Geneva, Switzerland), 1-p-menthene-4-ol, (1RS,3RS,4SR)-3-p-mentanyl acetate, (1R,2S,4R)-4,6,6-trimethyl-bicyclo[3,1,1]heptan-2-ol, tetrahydro-4-methyl-2-phenyl-2H-pyran (origin: Firmenich SA, Geneva, Switzerland), cyclohexyl acetate, cyclanol acetate, 1,4-cyclohexane diethyldicarboxylate (origin: Firmenich SA, Geneva, Switzerland), (3ARS,6SR,7ASR)-perhydro-3,6-dimethyl-benzo[B]furan-2-one (origin: Firmenich SA, Geneva, Switzerland), ((6R)-perhydro-3,6-dimethyl-benzo[B]furan-2-one (origin: Firmenich SA, Geneva, Switzerland), 2,4,6-trimethyl-4-phenyl-1,3-dioxane, 2,4,6-trimethyl-3-cyclohexene-1-carbaldehyde;

Group 2: (E)-3-methyl-5-(2,2,3-trimethyl-3-cyclopenten-1-yl)-4-penten-2-ol (origin: Givaudan SA, Vernier, Switzerland), (1'R,E)-2-ethyl-4-(2',2',3'-trimethyl-3'-cyclopenten-1'-yl)-2-buten-1-ol (origin: Firmenich SA, Geneva, Switzerland), (1'R,E)-3,3-dimethyl-5-(2',2',3'-trimethyl-3'-cyclopenten-1'-yl)-4-penten-2-ol (origin: Firmenich SA, Geneva, Switzerland), 2-heptylcyclopentanone, methyl-cis-3-oxo-2-pentyl-1-cyclopentane acetate (origin: Firmenich SA, Geneva, Switzerland), 2,2,5-Trimethyl-5-pentyl-1-cyclopentanone (origin: Firmenich SA, Geneva, Switzerland), 3,3-dimethyl-5-(2,2,3-trimethyl-3-cyclopenten-1-yl)-4-penten-2-ol (origin: Firmenich SA, Geneva, Switzerland), 3-methyl-5-(2,2,3-trimethyl-3-cyclopenten-1-yl)-2-pentanol (origin, Givaudan SA, Vernier, Switzerland);

Group 3: damascones, 1-(5,5-dimethyl-1-cyclohexen-1-yl)-4-penten-1-one (origin: Firmenich SA, Geneva, Switzerland), nectalactone ((1'R)-2-[2-(4'-methyl-3'-cyclohexen-1'-yl)propyl]cyclopentanone), alpha-ionone, beta-ionone, damascenone, mixture of 1-(5,5-dimethyl-1-cyclohexen-1-yl)-4-penten-1-one and 1-(3,3-dimethyl-1-cyclohexen-1-yl)-4-penten-1-one (origin: Firmenich SA, Geneva, Switzerland), 1-(2,6,6-trimethyl-1-cyclohexen-1-yl)-2-buten-1-one (origin: Firmenich SA, Geneva, Switzerland), (1S,1'R)-[1-(3',3'-Dimethyl-1'-cyclohexyl)ethoxycarbonyl]methyl propanoate (origin: Firmenich SA, Geneva, Switzerland), 2-tert-butyl-1-cyclohexyl acetate (origin: International Flavors and Fragrances, USA), 1-(2,2,3,6-tetramethyl-cyclohexyl)-3-hexanol (origin: Firmenich SA, Geneva, Switzerland), trans-1-(2,2,6-trimethyl-1-cyclohexyl)-3-hexanol (origin: Firmenich SA, Geneva, Switzerland), (E)-3-methyl-4-(2,6,6-trimethyl-2-cyclohexen-1-yl)-3-buten-2-one, terpenyl isobutyrate, 4-(1,1-dimethylethyl)-1-cyclohexyl acetate (origin: Firmenich SA, Geneva, Switzerland), 8-methoxy-1-p-menthene, (1S,1'R)-2-[1-(3',3'-dimethyl-1'-cyclohexyl)ethoxy]-2-methylpropyl propanoate (origin: Firmenich SA, Geneva, Switzerland), para tert-butylcyclohexanone, menthenethiol, 1-methyl-4-(4-methyl-3-pentenyl)-3-cyclohexene-1-carbaldehyde, allyl cyclohexylpropionate, cyclohexyl salicylate, 2-methoxy-4-methylphenyl methyl carbonate, ethyl 2-methoxy-4-methylphenyl carbonate, 4-ethyl-2-methoxyphenyl methyl carbonate;

Group 4: Methyl cedryl ketone (origin: International Flavors and Fragrances, USA), a mixture of (1RS,2SR,6RS,7RS,8SR)-tricyclo[5.2.1.0-2,6-]dec-3-en-8-yl 2-methylpropanoate and (1RS,2SR,6RS,7RS,8SR)-tricyclo[5.2.1.0-2,6-]dec-4-en-8-yl 2-methylpropanoate, vetyverol, vetyverone, 1-(octahydro-2,3,8,8-tetramethyl-2-naphtalenyl)-1-ethanone (origin: International Flavors and Fragrances, USA), (5RS,9RS,10SR)-2,6,9,10-tetramethyl-1-oxaspiro[4.5]deca-3,6-diene and the (5RS,9SR,10RS) isomer, 6-ethyl-2,10,10-trimethyl-1-oxaspiro[4.5]deca-3,6-diene, 1,2,3,5,6,7-hexahydro-1,1,2,3,3-pentamethyl-4-indenone (origin: International Flavors and Fragrances, USA), a mixture of 3-(3,3-dimethyl-5-indanyl)propanal and 3-(1,1-dimethyl-5-indanyl)propanal (origin: Firmenich SA, Geneva, Switzerland), 3',4-dimethyl-tricyclo[6.2.1.0(2,7)]undec-4-ene-9-spiro-2'-oxirane (origin: Firmenich SA, Geneva, Switzerland), 9/10-ethyldiene-3-oxatricyclo[6.2.1.0(2,7)]undecane, (perhydro-5,5,8A-trimethyl-2-naphthalenyl acetate (origin: Firmenich SA, Geneva, Switzerland), octalynol, (dodecahydro-3a,6,6,9a-tetramethyl-naphtho[2,1-b]furan, origin: Firmenich SA, Geneva, Switzerland), tricyclo[5.2.1.0(2,6)]dec-3-en-8-yl acetate and tricyclo[5.2.1.0(2,6)]dec-4-en-8-yl acetate as well as tricyclo[5.2.1.0(2,6)]dec-3-en-8-yl propanoate and tricyclo[5.2.1.0(2,6)]dec-4-en-8-yl propanoate, (+)-(1S,2S,3S)-2,6,6-trimethyl-bicyclo[3.1.1]heptane-3-spiro-2'-cyclohexen-4'-one;

Group 5: camphor, borneol, isobornyl acetate, 8-isopropyl-6-methyl-bicyclo[2.2.2]oct-5-ene-2-carbaldehyde, pinene, camphene, 8-methoxycedrane, (8-methoxy-2,6,6,8-tetramethyl-tricyclo[5.3.1.0(1,5)]undecane (origin: Firmenich SA, Geneva, Switzerland), cedrene, cedrenol, cedrol, mixture of 9-ethylidene-3-oxatricyclo[6.2.1.0(2,7)]undecan-4-one and 10-ethylidene-3-oxatricyclo[6.2.1.0(2,7)]undecan-4-one (origin: Firmenich SA, Geneva, Switzerland), 3-methoxy-7,7-dimethyl-10-methylene-bicyclo[4.3.1]decane (origin: Firmenich SA, Geneva, Switzerland);

Group 6: (trimethyl-13-oxabicyclo-[10.1.0]-trideca-4,8-diene (origin: Firmenich SA, Geneva, Switzerland), Ambrettolide LG ((E)-9-hexadecen-16-olide, origin: Firmenich SA, Geneva, Switzerland), pentadecenolide (origin: Firmenich SA, Geneva, Switzerland), muscenone (3-methyl-(4/5)-cyclopentadecenone, origin: Firmenich SA, Geneva, Switzerland), 3-methylcyclopentadecanone (origin: Firmenich SA, Geneva, Switzerland), pentadecanolide (origin: Firmenich SA, Geneva, Switzerland), cyclopentadecanone (origin: Firmenich SA, Geneva, Switzerland), 1-ethoxyethoxy) cyclododecane (origin: Firmenich SA, Geneva, Switzerland), 1,4-dioxacycloheptadecane-5,17-dione, 4,8-cyclododecadien-1-one;

Group 7: (+−)-2-methyl-3-[4-(2-methyl-2-propanyl)phenyl]propanal (origin: Givaudan SA, Vernier, Switzerland), 2,2,2-trichloro-1-phenylethyl acetate.

According to an embodiment, the perfume comprises at least 30%, particularly at least 50%, more particularly at least 60% of ingredients selected from Groups 1 to 7, as defined above. According to an embodiment, said perfume comprises at least 30%, particularly at least 50% of ingredients from Groups 3 to 7, as defined above. According to an embodiment, said perfume comprises at least 30%, particularly at least 50% of ingredients from Groups 3, 4, 6 or 7, as defined above.

According to an embodiment, the perfume comprises at least 30%, particularly at least 50%, more particularly at least 60% of ingredients having a logP above 3, particularly above 3.5 and even more particularly above 3.75.

According to an embodiment, the perfume used in the invention contains less than 10% of its own weight of primary alcohols, less than 15% of its own weight of secondary alcohols and less than 20% of its own weight of tertiary alcohols. According to an embodiment, the perfume used in the invention does not contain any primary alcohols and contains less than 15% of secondary and tertiary alcohols.

It is also understood that perfuming ingredients may also be compounds known to release in a controlled manner various types of perfuming compounds also known as properfumes or profragrances. Non-limiting examples of suitable properfume may include 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 2-(dodecylthio)octan-4-one, 2-phenylethyl oxo(phenyl)acetate, 3,7-dimethylocta-2,6-dien-1-yl oxo(phenyl)acetate, (Z)-hex-3-en-1-yl oxo(phenyl)acetate, 3,7-dimethyl-2,6-octadien-1-yl hexadecanoate, bis(3,7-dimethylocta-2,6-dien-1-yl) succinate, (2-((2-methylundec-1-en-1-yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl)oxy)-2-methylundec-1-ene, (2-((2-methylundec-1-en-1-yl)oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene, (2-((2-pentylcyclopentylidene)methoxy)ethyl)benzene or a mixture thereof.

The perfuming ingredients may be dissolved in a solvent of current use in the perfume industry. According to an embodiment, the solvent is not an alcohol. Examples of such solvents are diethyl phthalate, isopropyl myristate, Abalyn® (rosin resins, available from Eastman), benzyl benzoate, ethyl citrate, limonene or other terpenes, or isoparaffins. According to an embodiment, the solvent is very hydrophobic and highly sterically hindered, like for example Abalyn® or benzyl benzoate. According to an embodiment, the perfume comprises less than 30% of solvent.

According to an embodiment, the perfume comprises less than 20% and even more particularly less than 10% of solvent, all these percentages being defined by weight relative to the total weight of the perfume. According to an embodiment, the perfume is essentially free of solvent.

According to an embodiment, the oil phase (or the oil-based core) comprises:
  25-100 wt % of a perfume oil comprising at least 15 wt % of high impact perfume raw materials having a Log T<−4, and
  0-75 wt % of a density balancing material having a density greater than 1.07 g/cm$^3$.

The nature of high impact perfume raw materials having a Log T<−4 and density balancing material having a density greater than 1.07 g/cm$^3$ are described in WO 2018/115250, the content of which is included by reference.

According to a particular embodiment, the hydrophobic material is free of any active ingredient (such as perfume). According to this particular embodiment, it comprises, preferably consists of hydrophobic solvents, preferably chosen from the group consisting of isopropyl myristate, tryglycerides (e.g. Neobee® MCT oil, vegetable oils), D-limonene, silicone oil, mineral oil, and mixtures thereof with optionally hydrophilic solvents preferably chosen from the group consisting of 1,4 butanediol, benzyl alcohol, triethyl citrate, triacetin, benzyl acetate, ethyl acetate, propylene glycol (1,2-propanediol), 1,3-Propanediol, dipropylene glycol, glycerol, glycol ethers and mixtures thereof.

By "flavor" (or also "flavor oil") it is meant here a flavoring ingredient or a mixture of flavoring ingredients, solvent or adjuvants of current use for the preparation of a flavoring formulation, i.e. a particular mixture of ingredients which is intended to be added to an edible composition or chewable product to impart, improve or modify its organoleptic properties, in particular its flavor and/or taste. Taste modulator as also encompassed in said definition. Flavoring ingredients are well known to a skilled person in the art and their nature does not warrant a detailed description here, which in any case would not be exhaustive, the skilled flavorist being able to select them on the basis of his general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, can Nostrand Co., Inc. Solvents and adjuvants or current use for the preparation of a flavoring formulation are also well known in the art.

In a particular embodiment, the flavor is selected from the group consisting of terpenic flavors including citrus and mint oil, and sulfury flavors.

The term "biocide" refers to a chemical substance capable of killing living organisms (e.g. microorganisms) or reducing or preventing their growth and/or accumulation. Biocides are commonly used in medicine, agriculture, forestry, and in industry where they prevent the fouling of, for example, water, agricultural products including seed, and oil pipelines. A biocide can be a pesticide, including a fungicide, herbicide, insecticide, algicide, molluscicide, miticide and rodenticide; and/or an antimicrobial such as a germicide, antibiotic, antibacterial, antiviral, antifungal, antiprotozoal and/or antiparasite.

As used herein, a "pest control agent" indicates a substance that serves to repel or attract pests, to decrease, inhibit or promote their growth, development or their activity. Pests refer to any living organism, whether animal, plant or fungus, which is invasive or troublesome to plants or animals, pests include insects notably arthropods, mites, spiders, fungi, weeds, bacteria and other microorganisms.

Amino-Compound

The amino-compound is preferably chosen from the group consisting of an amino acid (such as L-Lysine, L-Lysine ethyl ester, L-Arginine, L-Histidine, L-Tryptophane, L-Serin, L-Glutamine, L-Threonine), guanidine carbonate, chitosan, 3-aminopropyltriethoxysilane, xylylene diamine, 1,2-diaminocyclohexane, 1,4-diaminocyclohexane, polyetheramines (Jeffamine®), ethylene diamine, diethylene triamine, spermine, spermidine, polyamidoamine (PAMAM), guanidine carbonate, chitosan, tris-(2-aminoethyl) amine, 3-aminopropyltriethoxysilane, an amine having a disulfide bond such as cystamine, cystamine hydrochloride, cystine, cystine hydrochloride, cystine dialkyl ester, cystine dialkyl ester hydrochloride and mixtures thereof. According to a particular embodiment, the shell comprises two different amino-compounds, namely a first amino-compound and a second amino-compound.

According to a particular embodiment, the first amino-compound is an amino-acid, preferably chosen from the group consisting of L-Lysine, L-Arginine, L-Histidine, L-Tryptophane, L-Serin, L-Glutamine, L-Threonine and mixtures thereof, preferably L-Lysine, L-Arginine, L-Histidine, L-Tryptophane and mixtures thereof, more preferably L-Lysine, L-Arginine, L-Histidine and mixtures thereof.

The amino-acid has preferably two nucleophilic groups.

The first amino compound may be chosen from the group consisting of L-Lysine, L-Lysine ethyl ester, guanidine carbonate, chitosan, 3-aminopropyltriethoxysilane, and mixtures thereof. According to a particular embodiment, the first amino compound is L-Lysine.

As non-limiting examples, the second amino-compound is chosen from the group consisting of a xylylene diamine, 1,2-diaminocyclohexane, 1,4-diaminocyclohexane, L-Lysine, L-Lysine ethyl ester, polyetheramines (Jeffamine®), ethylene diamine, diethylene triamine, spermine, spermidine, polyamidoamine (PAMAM), guanidine carbonate, chitosan, tris-(2-aminoethyl)amine, 3-aminopropyltriethoxysilane, L-Arginine, an amine having a disulfide bond such as cystamine, cystamine hydrochloride, cystine, cystine hydrochloride, cystine dialkyl ester, cystine dialkyl ester hydrochloride and mixtures thereof.

According to an embodiment, the second amino-compound is an amine having a disulfide bond and is chosen from the group consisting of cystamine, cystamine hydrochloride, cystine, cystine hydrochloride, cystine dialkyl ester, cystine dialkyl ester hydrochloride and mixtures thereof.

According to another embodiment, the second amino-compound is chosen from the group consisting of xylylene diamine, 1,2-diaminocyclohexane, 1,4-diaminocyclohexane, L-Lysine, L-Lysine ethyl ester, Jeffamine®, ethylene diamine, diethylene triamine, spermine, spermidine, polyamidoamine (PAMAM), guanidine carbonate, chitosan, tris-(2-aminoethyl)amine, 3-aminopropyltriethoxysilane, L-Arginine and mixtures thereof.

According to a particular embodiment, the second amino-compound is a mixture of two amino-compounds, preferably a mixture of ethylene diamine and diethylene triamine.

According to an embodiment, the weight ratio between the first amino compound and the second amino compound is comprised between 0.5 and 25, preferably between 1.3 and 10, more preferably between 1.3 and 7.

When a first and a second amino-compounds are present in the shell:
  the molar ratio between the functional groups $NH_2$ of the second amino compound and the functional groups COCl of the acyl chloride is preferably comprised between 0.01 and 7.5, more preferably from 0.1 to 3.0, and/or
  the functional groups $NH_2$ of the first amino compound and the functional groups COCl of the acyl chloride is preferably comprised between 0.2 and 3, more preferably from 0.5 to 2.

Stabilizer

According to an embodiment, the shell comprises a stabilizer.

For the sake of clarity, in the present context, by the expression "stabilizer", or the similar, it is meant the normal meaning understood by a person skilled in the art, i.e. a compound that is capable, or is added to, stabilize the oil-in-water interface, e.g. to prevent phase separation, or aggregation or agglomeration of the microcapsules, for example in the application or during their preparation. The use of said stabilizer is standard knowledge of the person skilled in the art.

For the purpose of the present invention, said stabilizer can be an ionic or non-ionic surfactant, solid particles (Pickering) or a colloidal stabilizer. The exact nature of such stabilizers is well known by a person skilled in the art.

According to an embodiment, the stabilizer is chosen from the group consisting of gum Arabic, modified starch, polyvinyl alcohol, polyvinylpyrolidone (PVP), carboxymethylcellulose (CMC), anionic polysaccharides, acrylamide copolymer, inorganic particles, protein such as soy protein, rice protein, whey protein, white egg albumin, sodium caseinate, gelatin, bovine serum albumin, hydrolyzed soy protein, hydrolyzed sericin, pseudocollagen, silk protein, sericin powder, and mixtures thereof.

According to a particular embodiment, the stabilizer is a biopolymer.

By "biopolymers" are meant biomacromolecules produced by living organisms. Biopolymers are characterized by molecular weight distributions ranging from 1,000 (1 thousand) to 1,000,000,000 (1 billion) Daltons. These macromolecules may be carbohydrates (sugar based) or proteins (amino-acid based) or a combination of both (gums) and can be linear or branched.

According to a particular embodiment, the stabilizer is a biopolymer chosen from the group consisting of protein such as whey protein, casein, sodium caseinate, bovine serum albumin, and mixtures thereof.

According to a particular embodiment, the polyamide core-shell microcapsule comprises:
- an oil-based core comprising a hydrophobic material, preferably a perfume, and
- a polyamide shell comprising:
  - at least one acyl chloride as defined previously, preferably in an amount comprised between 5 and 98% w/w;
  - a first amino compound as defined previously, preferably in an amount comprised between 1% and 80% w/w;
  - optionally, a second amino compound as defined previously, preferably in an amount comprised between 1% and 80% w/w;
  - optionally a stabilizer as defined previously, preferably a biopolymer, preferably in an amount comprised between 0 and 90% w/w.

It should be understood that the total of shell components equals 100%.

According to a particular embodiment, the polyamide core-shell microcapsule comprises:
- an oil-based core comprising a hydrophobic material, preferably a perfume, and
- a polyamide shell comprising:
  - at least one acyl chloride as defined previously,
  - a first amino compound being an amino-acid, preferably chosen from the group consisting of L-Lysine, L-Arginine, L-Histidine, L-Tryptophane and/or mixture thereof.
  - a second amino compound chosen from the group consisting of ethylene diamine, diethylene triamine, cystamine and mixtures thereof, and
  - a biopolymer chosen from the group consisting of casein, sodium caseinate, bovin serum albumin, whey protein, and mixtures thereof.

According to a particular embodiment, the polyamide core-shell microcapsule comprises an additional polyurea layer.

Optional Outer Coating

According to a particular embodiment of the invention, microcapsules of the invention may comprise an outer coating containing a polymer selected from the group consisting of a non-ionic polysaccharide, an anionic coating, a cationic polymer, a polysuccinimide derivative, and mixtures thereof to form an outer coating to the microcapsule.

Non-ionic polysaccharide polymers are well known to a person skilled in the art and are described for instance in WO 2012/007438 page 29, lines 1 to 25 and in WO 2013/026657 page 2, lines 12 to 19 and page 4, lines 3 to 12. Preferred non-ionic polysaccharides are selected from the group consisting of locust bean gum, xyloglucan, guar gum, hydroxypropyl guar, hydroxypropyl cellulose and hydroxypropyl methyl cellulose.

Cationic polymers are well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 3.5 M Dalton, more preferably between 50,000 and 1.5 M Dalton. According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

Another object of the invention is a solid particle comprising:
- a polymeric carrier material, preferably chosen from the group consisting of polyvinyl acetate, polyvinyl alcohol, dextrins, natural or modified starch, vegetable gums, pectins, xanthans, alginates, carrageenans, cellulose derivatives and mixtures thereof, and
- microcapsules as defined above entrapped in said carrier material, and
- optionally free perfume entrapped in said carrier material.

Solid particles as defined above and microcapsule powders are used indifferently in the present invention.

Process for Preparing a Polyamide Microcapsules

Another object of the invention is a process for preparing a polyamide core-shell microcapsule slurry comprising the following steps:

a) Dissolving at least one acyl chloride in a hydrophobic material, preferably a perfume to form an oil phase;
b) Dispersing the oil phase obtained in step a) into a water phase to obtain an oil-in-water emulsion;
c) Performing a curing step to form polyamide microcapsules in the form of a slurry;
wherein a stabilizer is added to the oil phase and/or in the water phase, and
wherein at least one amino-compound is added to the water phase before the formation of the oil-in-water emulsion and/or in the oil-in water emulsion obtained after step b)
wherein the acyl chloride has the following formula (I)

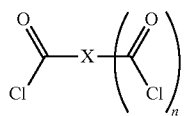
(I)

wherein n is an integer varying between 1 and 8, preferably between 1 and 6, more preferably between 1 and 4, and
wherein X is either an (n+1)-valent $C_3$ to $C_6$ alkyl group, or an (n+1)-valent $C_2$ to $C_{45}$ hydrocarbon group comprising at least one group selected from (i) to (vi),

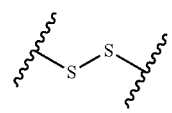
(i)

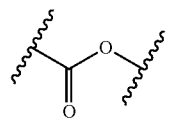
(ii)

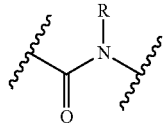
(iii)

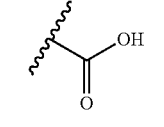
(iv)

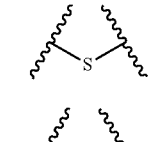
(v)

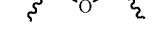
(vi)

wherein R is a hydrogen atom or a methyl or ethyl group, preferably a hydrogen atom, with the proviso that cyclohexane-1,3,5-tricarbonyl trichloride and diglycocyl chloride are excluded.

In one step of the process, an oil phase is formed by admixing at least one hydrophobic material with at least one acyl chloride as defined above.

The hydrophobic material is defined as previously.

According to any one of the invention's embodiments, the hydrophobic material represents between about 10% and 60% w/w, or even between 15% and 45% w/w, by weight, relative to the total weight of the emulsion as obtained after step b).

According to a particular embodiment, an additional acyl chloride preferably chosen from the group consisting of benzene-1,3,5-tricarbonyl chloride, benzene-1,2,4-tricarbonyl trichloride, benzene-1,2,4,5-tetracarbonyl tetrachloride, cyclohexane-1,3,5-tricarbonyl trichloride, isophthalyol dichloride, diglycolyl dichloride, succinic dichloride, and mixtures thereof is added with the acyl chloride of formula (I) to the oil phase.

The weight ratio between acyl chloride and the hydrophobic material is preferably comprised between 0.01 to 0.2, preferably from 0.01 and 0.09, more preferably between 0.03 and 0.07.

The acyl chloride can be dissolved directly in the hydrophobic material, preferably a perfume oil or can be pre-dispersed in an inert solvent such as benzyl benzoate before mixing with the hydrophobic material.

According to a particular embodiment, a polyisocyanate having at least two isocyanate functional groups is added to the oil phase.

Suitable polyisocyanates used according to the invention include aromatic polyisocyanates, aliphatic polyisocyanates and mixtures thereof. Said polyisocyanate comprises at least 2, preferably at least 3 but may comprise up to 6, or even only 4, isocyanate functional groups. According to a particular embodiment, a triisocyanate (3 isocyanate functional group) is used.

According to one embodiment, said polyisocyanate is an aromatic polyisocyanate.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets, polyisocyanurates and trimethylol propane adducts of diisocyanates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). In a most preferred embodiment, the aromatic polyisocyanate is a trimethylol propane-adduct of xylylene diisocyanate.

According to another embodiment, said polyisocyanate is an aliphatic polyisocyanate. The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100), among which a biuret of hexamethylene diisocyanate is even more preferred.

According to another embodiment, the at least one polyisocyanate is in the form of a mixture of at least one aliphatic polyisocyanate and of at least one aromatic polyisocyanate, both comprising at least two or three isocyanate functional groups, such as a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate. Preferably, when used as a mixture the molar ratio between the aliphatic polyisocyanate and the aromatic polyisocyanate is ranging from 80:20 to 10:90.

According to an embodiment, the at least one polyisocyanate used in the process of the invention is present in amounts representing from 0.1 to 15%, preferably from 0.5 to 10% and more preferably from 0.8 to 6%, and even more preferably between 1 and 3% by weight based on the total amount of the oil phase.

According to the process of the invention, a stabilizer is added to the oil phase and/or in the water phase. The stabilizer is defined as previously.

When the colloidal stabilizer is added to the oil phase, it is preferably chosen from the group consisting of proteins such as soy protein, rice protein, whey protein, white egg albumin, sodium caseinate, gelatin, bovine serum albumin, hydrolyzed soy protein, hydrolyzed sericin, pseudocollagen, silk protein, sericin powder, and mixtures thereof.

When added to the oil phase, the stabilizer can be predispersed in an inert solvent such as benzyl benzoate or can be mixed to the active ingredient, preferably comprising a perfume oil.

The stabilizer and the acyl chloride can be premixed and can be heated at a temperature between for example 10 and 80° C. before mixing with the hydrophobic material, preferably comprising a perfume oil.

When the colloidal stabilizer is added to the water phase, it is preferably chosen from the group consisting of gum Arabic, modified starch, polyvinyl alcohol, polyvinylpyrrolidone (PVP), carboxymethylcellulose (CMC), anionic polysaccharides, acrylamide copolymer, inorganic particles, protein such as soy protein, rice protein, whey protein, white egg albumin, sodium caseinate, gelatin, bovine serum albumin, hydrolyzed soy protein, hydrolyzed sericin, Pseudocollagen, Silk protein, sericin powder, and mixtures thereof.

According to any one of the above embodiments of the present invention, the emulsion comprises between about 0.01% and 3.0% of at least a stabilizer, percentage being expressed on a w/w basis relative to the total weight of the oil-in-water emulsion as obtained after step b). In still another aspect of the invention, the emulsion comprises between about 0.05% and 2.0%, preferably between 0.05 and 1% of at least a colloid stabilizer. In still another aspect of the invention, the emulsion comprises between about 0.1% and 1.6%, preferably between 0.1% and 0.8% by weight of at least a colloid stabilizer.

According to the process of the invention, at least one amino-compound is added to the water phase before the formation of the oil-in-water emulsion and/or in the oil-in water emulsion obtained after step b). The nature of the amino-compound is defined as previously.

According to a particular embodiment, the oil phase of step a) is dispersed into a water phase comprising a first amino compound and optionally a stabilizer to form an oil-in-water emulsion.

According to another embodiment, the oil phase of step a) is dispersed into a water phase comprising two amino compounds and optionally a stabilizer to form an oil-in-water emulsion.

The emulsion may be prepared by high shear mixing and adjusted to the desired droplet size. The mean droplet size of the emulsion is preferably comprised between 1 and 1000 microns, more preferably between 1 and 500 microns, and even more preferably between 5 and 50 microns.

The first amino-compound is defined as previously.

According to an embodiment, in another step of the process according to an embodiment, a second amino compound is added to the oil-in-water emulsion obtained in step b). The second amino compound is defined as above.

According to a particular embodiment, the process comprises the steps of:
i) Dissolving at least one acyl chloride in a hydrophobic material, preferably a perfume to form an oil phase;
ii) Dispersing the oil phase obtained in step a) into a water phase comprising a first amino compound to obtain an oil-in-water emulsion;
iii) Adding a second amino compound to the oil-in-water emulsion; and
iv) Performing a curing step to form polyamide microcapsules in the form of a slurry;
wherein a stabilizer is added to the oil phase and/or in the water phase, and
wherein the acyl chloride is defined as above.

Without being bound by any theory, the inventors are of the opinion that when two amino-compounds are added during the process, the first amino compound will react with the acyl chloride to form a polyamide and the second amino compound will react with remaining acyl chloride groups of the acyl chloride.

According to a particular embodiment, the first amino compound and the second amino compound are the same.

According to another particular embodiment, the first amino compound and the second amino compound are different.

According to an embodiment, the weight ratio between the first amino compound and the second amino compound is comprised between 0.5 and 25, preferably between 1.3 and 10, more preferably between 1.3 and 7.

According to a particular embodiment, two amino compounds are added, preferably successively, during the process, the first amino compound being added in step b) in the water phase and preferably at least a second amino compound being added once the emulsion is formed. Indeed, without being bound by any theory, the inventors observed that the combination of both amino compounds led to stable microcapsules in consumer products.

The amount of the second amino compound used is typically adjusted so that the molar ratio between the functional groups $NH_2$ of the second amino compound and the functional groups COCl of the acyl chloride is comprised between 0.01 and 7.5, preferably from 0.1 to 3.0.

The amount of the first amino compound used is typically adjusted so that the molar ratio between the functional groups $NH_2$ of the first amino compound and the functional groups COCl of the acyl chloride is comprised between 0.2 and 3, preferably from 0.5 to 2.

According to an embodiment, a base is added at the end of step b) to adjust the pH. One may cite as non-limiting examples guanidine carbonate, sodium bicarbonate or triethanolamine.

According to a particular embodiment, the base is not an amino-compound.

The base is preferably added in an amount comprised between 0.1% and 10% by weight based on the oil-in-water emulsion, more preferably between 0.5% and 5%.

This is followed by a curing step c) which allows ending up with microcapsules in the form of a slurry. According to a preferred embodiment, to enhance the kinetics, said step is performed at a temperature comprised between 5 and 90° C., possibly under pressure, for 1 to 8 hours. More preferably it is performed at between 10 and 80° C. for between 30 minutes and 5 hours.

According to a particular embodiment of the invention, at the end of step d) or during step d), one may also add to the invention's slurry a polymer selected from the group consisting of a non-ionic polysaccharide, an anionic coating, a cationic polymer, a polysuccinimide derivative and mixtures thereof to form an outer coating to the microcapsule. Non-ionic polysaccharide or cationic polymer are as defined previously.

According to any one of the above embodiments of the invention, there is added an amount of polymer described above comprised between about 0% and 5% w/w, or even between about 0.1% and 2% w/w, percentage being expressed on a w/w basis relative to the total weight of the slurry as obtained after step c) or d). It is clearly understood by a person skilled in the art that only part of said added polymers will be incorporated into/deposited on the microcapsule shell.

Another object of the invention is a process for preparing a microcapsule powder comprising the steps as defined above and an additional step d) or e) consisting of submitting the slurry obtained in step c) or d) to a drying, like spray-drying, to provide the microcapsules as such, i.e. in a powdery form. It is understood that any standard method known by a person skilled in the art to perform such drying is also applicable. In particular the slurry may be spray-dried preferably in the presence of a polymeric carrier material such as polyvinyl acetate, polyvinyl alcohol, dextrins, natural or modified starch, vegetable gums, pectins, xanthans, alginates, carrageenans or cellulose derivatives to provide microcapsules in a powder form.

According to a particular embodiment, the carrier material contains free perfume oil, which can be the same or different from the perfume from the core of the microcapsules.

Another object of the invention is a polyamide microcapsule slurry obtainable by the process as described above.

Multiple Capsule System

According to an embodiment, the microcapsules of the invention (first type of microcapsule) can be used in combination with a second type of microcapsules.

Another object of the invention is a microcapsule delivery system comprising:
the microcapsules of the present invention as a first type of microcapsule, and
a second type of microcapsules, wherein the first type of microcapsule and the second type of microcapsules differ in their hydrophobic material and/or their wall material and/or in their coating material.

Perfuming Composition/Consumer Products

The microcapsules of the invention can be used in combination with active ingredients. An object of the invention is therefore a composition comprising:
(i) microcapsules as defined above;
(ii) an active ingredient, preferably chosen from the group consisting of a cosmetic ingredient, skin caring ingredient, perfume ingredient, flavor ingredient, malodour counteracting ingredient, bactericide ingredient, fungicide ingredient, pharmaceutical or agrochemical ingredient, a sanitizing ingredient, an insect repellent or attractant, and mixtures thereof.

The microcapsules of the invention can be used for the preparation of perfuming or flavoring compositions which are also an object of the invention.

The capsules of the invention show a good performance in terms of stability in challenging media.

Another object of the present invention is a perfuming composition comprising:
(i) microcapsules as defined above, wherein the oil comprises a perfume;
(ii) at least one ingredient selected from the group consisting of a perfumery carrier, a perfumery co-ingredient and mixtures thereof;
(iii) optionally at least one perfumery adjuvant.

As liquid perfumery carriers one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples solvents such as dipropyleneglycol, diethyl phthalate, isopropyl myristate, benzyl benzoate, 2-(2-ethoxyethoxy)-1-ethanol or ethyl citrate, which are the most commonly used. For the compositions, which comprise both a perfumery carrier and a perfumery co-ingredient, other suitable perfumery carriers than those previously specified, can be also ethanol, water/ethanol mixtures, limonene or other terpenes, isoparaffins such as those known under the trademark Isopar© (origin: Exxon Chemical) or glycol ethers and glycol ether esters such as those known under the trademark Dowanol® (origin: Dow Chemical Company). By "perfumery co-ingredient" it is meant here a compound, which is used in a perfuming preparation or a composition to impart a hedonic effect and which is not a microcapsule as defined above. In other words, such a co-ingredient, to be considered as being a perfuming one, must be recognized by a person skilled in the art as being able to at least impart or modify in a positive or pleasant way the odor of a composition, and not just as having an odor.

The nature and type of the perfuming co-ingredients present in the perfuming composition do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, thiols, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds. Co-ingredients may be chosen from the group consisting of 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 2-(dodecylthio)octan-4-one, 2-phenylethyl oxo(phenyl)acetate, 3,7-dimethylocta-2,6-dien-1-yl oxo(phenyl)acetate, (Z)-hex-3-en-1-yl oxo(phenyl)acetate, 3,7-dimethyl-2,6-octadien-1-yl hexadecanoate, bis(3,7-dimethylocta-2,6-dien-1-yl) succinate, (2-((2-methylundec-1-en-1- yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl)oxy)-2-methylundec-1-ene, (2-((2-methylundec-1-en-1-yl)oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene, (2-((2-pentylcyclopentylidene)methoxy)ethyl)benzene or a mixture thereof.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art.

Preferably, the perfuming composition according to the invention comprises between 0.01 and 30% by weight of microcapsules as defined above.

The invention's microcapsules can advantageously be used in many application fields and used in consumer products. Microcapsules can be used in liquid form applicable to liquid consumer products as well as in powder form, applicable to powder consumer products.

According to a particular embodiment, the consumer product as defined above is liquid and comprises:
a) from 2 to 65% by weight, relative to the total weight of the consumer product, of at least one surfactant;
b) water or a water-miscible hydrophilic organic solvent; and
c) a microcapsule slurry as defined above,
d) optionally non-encapsulated perfume.

According to a particular embodiment, the consumer product as defined above is in a powder form and comprises:
a) from 2 to 65% by weight, relative to the total weight of the consumer product, of at least one surfactant;
b) a microcapsule powder as defined above.
c) optionally a perfume powder that is different from the microcapsules defined above.

In the case of microcapsules including a perfume oil-based core, the products of the invention, can in particular be used in perfumed consumer products such as products belonging to fine fragrance or "functional" perfumery. Functional perfumery includes in particular personal-care products including hair-care, body cleansing, skin care, hygiene-care as well as home-care products including laundry care and air care. Consequently, another object of the present invention consists of a perfumed consumer product comprising, as a perfuming ingredient, the microcapsules defined above or a perfuming composition as defined above. The perfume element of said consumer product can be a combination of perfume microcapsules as defined above and a free or non-encapsulated perfume, as well as other types of perfume microcapsules than those here-disclosed.

In particular a liquid consumer product comprising:
a) from 2 to 65% by weight, relative to the total weight of the consumer product, of at least one surfactant;
b) water or a water-miscible hydrophilic organic solvent; and
c) a perfuming composition as defined above is another object of the invention.

Also, a powder consumer product comprising
(a) from 2 to 65% by weight, relative to the total weight of the consumer product, of at least one surfactant; and (b) a perfuming composition as defined above is part of the invention.

The invention's microcapsules can therefore be added as such or as part of an invention's perfuming composition to a perfumed consumer product.

For the sake of clarity, it has to be mentioned that, by "perfumed consumer product" it is meant a consumer product which is expected to deliver among different benefits a perfuming effect to the surface to which it is applied (e.g. skin, hair, textiles, paper, or home surfaces) or in the air (air-fresheners, deodorizers etc.). In other words, a perfumed consumer product according to the invention is a manufactured product which comprises a functional formulation also referred to as "base", together with benefit agents, among which an effective amount of microcapsules according to the invention.

The nature and type of the other constituents of the perfumed consumer product do not warrant a more detailed description here, which in any case would not be exhaustive, the skilled person being able to select them on the basis of his general knowledge and according to the nature and the desired effect of said product. Base formulations of consumer products in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Non-limiting examples of suitable perfumed consumer product can be a perfume, such as a fine perfume, a cologne, an after-shave lotion, a body-splash; a fabric care product, such as a liquid or solid detergent, tablets and pods, a fabric softener, a dryer sheet, a fabric refresher, an ironing water, or a bleach; a personal-care product, such as a hair-care product (e.g. a shampoo, hair conditioner, a coloring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a hygiene product); an air care product, such as an air freshener or a "ready to use" powdered air freshener; or a home care product, such all-purpose cleaners, liquid or power or tablet dishwashing products, toilet cleaners or products for cleaning various surfaces, for example sprays & wipes intended for the treatment/refreshment of textiles or hard surfaces (floors, tiles, stone-floors etc.); a hygiene product such as sanitary napkins, diapers, toilet paper.

Another object of the invention is a consumer product comprising:
a personal care active base, and
microcapsules as defined above or the perfuming composition as defined above, wherein the consumer product is in the form of a personal care composition.

Personal care active bases in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

The personal care composition is preferably chosen from the group consisting of a hair-care product (e.g. a shampoo, hair conditioner, a coloring preparation or a hair spray), a cosmetic preparation (e.g. a vanishing cream, body lotion or a deodorant or antiperspirant), or a skin-care product (e.g. a perfumed soap, shower or bath mousse, body wash, oil or gel, bath salts, or a hygiene product);

Another object of the invention is a consumer product comprising:
- a home care or a fabric care active base, and
- microcapsules as defined above or the perfuming composition as defined above, wherein the consumer product is in the form of a home care or a fabric care composition.

Home care or fabric care active bases in which the microcapsules of the invention can be incorporated can be found in the abundant literature relative to such products. These formulations do not warrant a detailed description here which would in any case not be exhaustive. The person skilled in the art of formulating such consumer products is perfectly able to select the suitable components on the basis of his general knowledge and of the available literature.

Preferably, the consumer product comprises from 0.1 to 15 wt %, more preferably between 0.2 and 5 wt % of the microcapsules of the present invention, these percentages being defined by weight relative to the total weight of the consumer product. Of course, the above concentrations may be adapted according to the benefit effect desired in each product.

According to a particular embodiment, the consumer product in which the microcapsules are incorporated has a pH lower than 4.5.

For liquid consumer product mentioned below, by "active base", it should be understood that the active base includes active materials (typically including surfactants) and water.

For solid consumer product mentioned below, by "active base", it should be understood that the active base includes active materials (typically including surfactants) and auxiliary agents (such as bleaching agents, buffering agent; builders; soil release or soil suspension polymers; granulated enzyme particles, corrosion inhibitors, antifoaming, sud suppressing agents; dyes, fillers, and mixtures thereof).

Fabric Softener

An object of the invention is a consumer product in the form of a fabric softener composition comprising:
- a fabric softener active base; preferably comprising at least one active material chosen from the group consisting of dialkyl quaternary ammonium salts, dialkyl ester quaternary ammonium salts (esterquats), Hamburg esterquat (HEQ), TEAQ (triethanolamine quat), silicones and mixtures thereof, the active base being used preferably in an amount comprised between 85 and 99.95% by weight based on the total weight of the composition,
- a microcapsule slurry as defined above, preferably in an amount comprised between 0.05 to 15 wt %, more preferably between 0.1 and 5 wt % by weight based on the total weight of the composition,
- optionally free perfume oil.

Liquid Detergent

An object of the invention is a consumer product in the form of a liquid detergent composition comprising:
- a liquid detergent active base; preferably comprising at least one active material chosen from the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and nonionic surfactant such as alkyl amines, alkanolamide, fatty alcohol poly (ethylene glycol) ether, fatty alcohol ethoxylate (FAE), ethylene oxide (EO) and propylene oxide (PO) copolymers, amine oxydes, alkyl polyglucosides, alkyl polyglucosamides, the active base being used preferably in an amount comprised between 85 and 99.95% by weight based on the total weight of the composition,
- a microcapsule slurry as defined above, preferably in an amount comprised between 0.05 to 15 wt %, more preferably between 0.1 and 5 wt % by weight based on the total weight of the composition,
- optionally free perfume oil.

Solid Detergent

An object of the invention is a consumer product in the form of a solid detergent composition comprising:
- a solid detergent active base; preferably comprising at least one active material chosen from the group consisting of anionic surfactant such as alkylbenzenesulfonate (ABS), secondary alkyl sulfonate (SAS), primary alcohol sulfate (PAS), lauryl ether sulfate (LES), methyl ester sulfonate (MES) and nonionic surfactant such as alkyl amines, alkanolamide, fatty alcohol poly (ethylene glycol) ether, fatty alcohol ethoxylate (FAE), ethylene oxide (EO) and propylene oxide (PO) copolymers, amine oxydes, alkyl polyglucosides, alkyl polyglucosamides, the active base being used preferably in an amount comprised between 85 and 99.95% by weight based on the total weight of the composition,
- a microcapsule powder or microcapsule slurry as defined above, preferably in an amount comprised between 0.05 to 15 wt %, more preferably between 0.1 and 5 wt % by weight based on the total weight of the composition,
- optionally free perfume oil.

Shampoo/Shower Gel

An object of the invention is a consumer product in the form of a shampoo or a shower gel composition comprising:
- a shampoo or a shower gel active base; preferably comprising at least one active material chosen from the group consisting of sodium alkylether sulfate, ammonium alkylether sulfates, alkylamphoacetate, cocamidopropyl betaine, cocamide MEA, alkylglucosides and amino acid based surfactants and mixtures thereof, the active base being used preferably in an amount comprised between 85 and 99.95% by weight based on the total weight of the composition,
- a microcapsule slurry as defined above, preferably in an amount comprised between 0.05 to 15 wt %, more preferably between 0.1 and 5 wt % by weight based on the total weight of the composition,
- optionally free perfume oil.

Rinse-Off Conditioner

An object of the invention is a consumer product in the form of a rinse-off conditioner composition comprising:
- a rinse-off conditioner active base; preferably comprising at least one active material chosen from the group consisting of cetyltrimonium chloride, stearyl trimonium chloride, benzalkonium chloride, behentrimonium chloride and mixture thereof, the active base being used preferably in an amount comprised between 85 and 99.95% by weight based on the total weight of the composition,
- a microcapsule slurry as defined above, preferably in an amount comprised between 0.05 to 15 wt %, more preferably between 0.1 and 5 wt % by weight based on the total weight of the composition,
- optionally free perfume oil.

Solid Scent Booster

An object of the invention is a consumer product in the form of a solid scent booster composition comprising:

a solid carrier, preferably chosen from the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides such as sucrose, mono-, di-, and polysaccharides and derivatives such as starch, cellulose, methyl cellulose, ethyl cellulose, propyl cellulose, polyols/sugar alcohols such as sorbitol, maltitol, xylitol, erythritol, and isomalt, PEG, PVP, citric acid or any water soluble solid acid, fatty alcohols or fatty acids and mixtures thereof, a microcapsule slurry as defined above, in a powdered form, preferably in an amount comprised between 0.05 to 15 wt %, more preferably between 0.1 and 5 wt % by weight based on the total weight of the composition, optionally free perfume oil.

Liquid Scent Booster

An object of the invention is a consumer product in the form of a liquid scent booster composition comprising:

an aqueous phase, a surfactant system essentially consisting of one or more than one non-ionic surfactant, wherein the surfactant system has a mean HLB between 10 and 14, preferably chosen from the group consisting of ethoxylated aliphatic alcohols, POE/PPG (polyoxyethylene and polyoxypropylene) ethers, mono and polyglyceryl esters, sucrose ester compounds, polyoxyethylene hydroxylesters, alkyl polyglucosides, amine oxides and combinations thereof;

a linker chosen from the group consisting of alcohols, salts and esters of carboxylic acids, salts and esters of hydroxyl carboxylic acids, fatty acids, fatty acid salts, glycerol fatty acids, surfactant having an HLB less than 10 and mixtures thereof, and a microcapsule slurry as defined above, in the form of a slurry, preferably in an amount comprised between 0.05 to 15 wt %, more preferably between 0.1 and 5 wt % by weight based on the total weight of the composition, optionally free perfume oil.

Hair Coloration

An object of the invention is a consumer product in the form of an oxidative hair coloring composition comprising:

an oxidizing phase comprising an oxidizing agent and an alkaline phase comprising an alkakine agent, a dye precursor and a coupling compound; wherein said dye precursor and said coupling compound form an oxidative hair dye in the presence of the oxidizing agent, preferably in an amount comprised between 85 and 99.95% by weight based on the total weight of the composition, a microcapsule slurry as defined above, preferably in an amount comprised between 0.05 to 15 wt %, more preferably between 0.1 and 5 wt % by weight based on the total weight of the composition, optionally free perfume oil By "oxidative hair coloring composition", it is meant a composition comprising two groups of colorless dye molecules: the dye precursor and the coupling agent. Upon reaction with each other through an oxidation process, they form a wide range of colored molecules (dyes) that are then trapped into the hair due their size. In other words, the dye precursor and the coupling compound form an oxidative hair dye in the presence of the oxidizing agent.

"Dye precursor" and "oxidative dye precursor" are used indifferently in the present invention.

Dye precursors can be aromatic compounds derived from benzene substituted by at least two electron donor groups such as $NH_2$ and OH in para or ortho positions to confer the property of easy oxidation.

According to an embodiment, dye precursors are chosen from the group consisting of p-phenylene diamine, 2,5-diamino toluene, N,N-bis(2-hydroxymethyl)-p-phenylene diamine, 4-aminophenol, 1,4-diamino-benzene, and mixtures thereof.

The primary dye precursor is used in combination with coupling agents. Coupling agents are preferably aromatic compounds derived from benzene and substituted by groups such as $NH_2$ and OH in the meta position and do not produce color singly, but which modify the color, shade or intensity of the colors developed by the dye precursor.

According to an embodiment, the coupling agent is chosen from the group consisting of resorcinol, 2-methyl resorcinol, 4-chlororesorcinol, 2,5-diamino-toluene, 1,3-diamino-benzene, 2,4-diaminophenoxyethanol HCl, 2-aminohydroxyethylaminoanisole sulfate, 4-amino-2-hydroxytoluene, and mixtures thereof.

The oxidative dye precursor is preferably used in an amount comprised between 0.001% and 5%, preferably between 0.1% and 4% by weight based on the total weight of the composition.

The use of oxidative dye precursors and coupling agents in hair coloring formulation have been widely disclosed in the prior art and is well-known from the person skilled in the art. One may cite for example EP 0946133A1, the content of which is incorporated by reference.

The alkaline phase comprises an alkaline agent, preferably chosen from the group consisting of ammonia hydroxide, ammonia carbonate, ethanolamine, potassium hydroxide, sodium borate, sodium carbonate, triethanolamine and mixtures thereof.

The alkaline agent is preferably used in an amount comprised between 1% and 10%, preferably between 3% and 9% by weight based on the total weight of the composition.

According to the invention, the coupling agent and the dye precursor in an alkaline medium form an oxidative hair dye in the presence of the oxidizing agent.

The oxidizing agent will supply the necessary oxygen gas to develop color molecules and create a change in hair color. The oxidizing agent should be safe and effective for use in the compositions herein.

Preferably, the oxidizing agents suitable for use herein will be soluble in the compositions according to the present invention when in liquid form and/or in the form intended to be used.

Preferably, oxidizing agents suitable for use herein will be water-soluble. Suitable oxidizing agents for use herein are selected from inorganic peroxygen oxidizing agents, preformed organic peroxyacid oxidizing agents and organic peroxide oxidizing agents or mixtures thereof.

The oxidizing agent is preferably used in an amount comprised between 5 and 30%, preferably between 5 and 25% by weight based on the total weight of the composition.

Components commonly used in cosmetic compositions may be added into the hair coloring composition as defined in the present invention. One may cite for example, surfactants, cationic polymers, oily substances, silicone derivatives, free perfume, preservatives, ultraviolet absorbents, antioxidants, germicides, propellants, thickeners.

According to a particular embodiment, the hair coloring composition comprises one or more quaternary ammonium compounds, preferably chosen from the group consisting of cetyltrimonium chloride, stearyl trimonium chloride, benzalkonium chloride, behentrimonium chloride and mixture thereof to confer hair conditioner benefits.

Perfuming Composition

According to a particular embodiment, the consumer product is in the form of a perfuming composition comprising:
- 0.1 to 30%, preferably 0.1 to 20% of microcapsules as defined previously,
- 0 to 40%, preferably 3-40% of perfume, and
- 20-90%, preferably 40-90% of ethanol, by weight based on the total weight of the perfuming composition.

The invention will now be further described by way of examples. It will be appreciated that the invention as claimed is not intended to be limited in any way by these examples.

EXAMPLES

The invention is hereafter described in a more detailed manner by way of the following examples, wherein the abbreviations have the usual meaning in the art, temperatures are indicated in degrees centigrade (° C.). NMR spectral data were recorded on a Bruker AMX 500 spectrometer in deuterated tetrahydrofuran (THF)-$d_8$ at 500 MHz for $^1$H and at 125.8 MHz for $^{13}$C if not indicated otherwise, the chemical displacements 6 are indicated in ppm with respect to $Si(CH_3)_4$ as the standard, the coupling constants J are expressed in Hz (br.=broad peak). Reactions were carried out in standard glassware under N2. Commercially available reagents and solvents were used without further purification if not stated otherwise.

Although specific conformations or configurations are indicated for some of the compounds, this is not meant to limit the use of these compounds to the isomers described. According to the invention, all possible conformation or configuration isomers are expected to have a similar effect.

Example 1

Preparation of Acyl Chlorides According to Formula (I)

(a) Synthesis of propane-1,2,3-tricarbonyl trichloride (Acyl Chloride 1)

In a Schlenk tube, previously dried in an oven at 150° C., thionyl chloride (20.0 mL, 1.64 g mL$^{-1}$, 276 mmol) and 2-3 drops of N,N-dimethylformamide (DMF) were added to propane-1,2,3-tricarboxylic acid (2.00 g, 11 mmol, origin: TCI). The reaction mixture was heated to reflux overnight under a flow of nitrogen, which was neutralised through a wash bottle containing an aqueous solution of NaOH (10%). An aliquot of the reaction mixture (0.1 mL) was pipetted off and placed in a small vial. After evaporating the $SOCl_2$ and flushing with argon, the sample (38 mg) was analyzed by NMR spectroscopy. The $SOCl_2$ of the rest of the sample was evaporated and the product flushed with argon.

$^1$H-NMR: 3.80 (quint., J=5.9 Hz, 1H), 3.64 (dd, J=19.1, 6.0 Hz, 2H), 3.56 (dd, J=19.1, 5.8 Hz, 2H).
$^{13}$C-NMR: 173.35, 172.32, 49.47, 47.08.

(b) Synthesis of cyclohexane-1,2,4,5-tetracarbonyl tetrachloride (Acyl Chloride 2)

In a Schlenk tube, previously dried in an oven at 150° C., $SOCl_2$ (25.0 mL, 345 mmol) and 3 drops of DMF were added to cyclohexane-1,2,4,5-tetracarboxylic acid (6.64 g, 26 mmol, origin: TCI). The reaction mixture was stirred at room temperature for 2 d under a flow of nitrogen, which was neutralized through a wash bottle containing an aqueous solution of NaOH (10%). An aliquot of the reaction mixture (0.05 mL) was pipetted off and placed in a small vial. After evaporating the $SOCl_2$ and flushing with argon, the sample (34 mg) was analyzed by NMR spectroscopy. The $SOCl_2$ of the rest of the sample was evaporated and the product flushed with argon.

$^1$H-NMR: 3.31-3.22 (m, 4H), 2.46-2.39 (m, 2H), 1.94-1.81 (m, 2H).
$^{13}$C-NMR: 173.43, 39.39, 21.97.

(c) Synthesis of 2,2'-disulfanediyldisuccinyl dichloride (Acyl Chloride 3)

Ferrous sulfate hydrate ($FeSO_4 \times 7\ H_2O$, 80 mg, 0.3 mmol) was added to a stirred solution of 2-mercaptosuccinic acid (thiomalic acid, 32, 29.6 g, 197.1 mmol, origin: TCI) in water (250 mL). Then hydrogen peroxide (35%, 14.59 g, 150.1 mmol) was added dropwise during 5-10 min, while maintaining the temperature below 35° C. with an ice bath. After stirring at room temperature overnight, the reaction mixture was extracted with ethyl acetate (250 mL, 3×). The aqueous layer was re-extracted with ethyl acetate (250 mL) and the combined organic layers were washed with a saturated aqueous solution of NaCl (100 mL, 2×), dried ($Na_2SO_4$) and concentrated (45° C., 5 mbar) to give 23.40 g of a white crystalline solid. The solid (22.38 g) was grinded and dried in a desiccator (0.06 mbar) to afford 22.10 g (79%) of 2,2'-disulfanediyldisuccinic acid as a mixture of diastereoisomers.

$^1$H-NMR (DMSO-$d_6$): 12.69 (br. s, 4H), 3.81-3.73 (m, 2H), 2.85 and 2.82 (dd, J=9.6, 3.5 Hz, 2H), 2.71 (dd, J=17.0, 4.8 Hz, 2H).
$^{13}$C-NMR (DMSO-$d_6$): 171.45, 171.38, 171.27, 47.94, 47.35, 35.83, 35.59.

In a Schlenk tube, $SOCl_2$ (11.6 mL, 160.0 mmol) was rapidly added to a suspension of 2,2'-disulfanediyldisuccinic acid (5.96 g, 20.0 mmol) in dichloromethane (40 mL). The reaction mixture was heated to reflux under a flow of nitrogen, which was neutralized through a wash bottle containing an aqueous solution of NaOH (10%). After 1 h, more dichloromethane (15 mL) was added and the reaction continued to be heated under reflux overnight. Then the solvent and the excess of $SOCl_2$ were distilled off under nitrogen via a distillation bridge. The product was dried with a membrane pump to afford the target compound.

$^1$H-NMR: 4.53-4.45 (m, 1H), 3.46 (dd, J=10.3, 3.6 Hz, 0.5H) and 3.42 (dd, J=10.0, 3.6 Hz, 0.5H), 3.14 (t, J=6.3 Hz, 0.5H) and 3.10 (t, J=6.3 Hz, 0.5H).
$^{13}$C-NMR: 171.64, 171.54, 169.04, 169.02, 49.41, 49.13, 36.20, 35.66.

(d) Synthesis of 2-(2-chloro-2-oxo-ethyl)sulfanylbutanedioyl dichloride (Acyl Chloride 4)

In a Schlenk tube, previously dried in an oven at 150° C., $SOCl_2$ (10.0 mL, 138 mmol) and 3 drops of DMF were added to 2-(carboxymethylsulfanyl)butanedioic acid (4.30 g, 20 mmol, origin: Alfa Aesar). The reaction mixture was stirred at room temperature over the week-end under a flow of nitrogen, which was neutralised through a wash bottle containing an aqueous solution of NaOH (10%). An aliquot of the reaction mixture (0.1 mL) was pipetted off and placed in a small vial. After evaporating the $SOCl_2$ and flushing with argon, the sample (38 mg) was analyzed by NMR spectroscopy. The SOCl$_2$ of the rest of the sample was evaporated and flushed with argon to afford the target compound.

$^1$H-NMR: 4.43 (d, J=17.3 Hz, 1H); 4.31-4.24 (m, 1H), 4.21 (d, J=17.3 Hz, 1H), 3.44 (dd, J=18.9, 9.9 Hz, 1H), 2.94-2.79 (m, 1H).

$^{13}$C-NMR: 171.65, 170.49, 169.21, 45.20, 40.64, 35.75.

(e) Synthesis of (4-chloro-4-oxobutanoyl)-L-glutamoyl dichloride (Acyl Chloride 5)

Sodium hydroxide (2.50 g) was rapidly added to a suspension of L-glutamic acid (8.83 g, 60 mmol) in water (100 mL), which was cooled on a water bath to maintain the temperature below 20° C. The pH was adjusted from 8.25 to 9.50 by adding an aqueous solution of NaOH (10%, 8 mL). Succinic anhydride (6.00 g, 60 mmol) was added in portions of 1 g every 15 min, while maintaining the reaction temperature at ca. 20° C. with a cold water bath. The pH was maintained at 9.0-9.5 after each addition with an aqueous solution of NaOH (10%, 10 mL were necessary each time, and in total 50 mL were added). A colorless solution (pH 9.40) was obtained. The reaction mixture was left stirring at room temperature over the week-end (pH 9.13). In a Buchner filter, a Dowex® Marathon resin (65 g) was washed with an aqueous solution of HCl (10%) and demineralized water to neutrality. The Dowex® resin was slowly added to the reaction in small portions (pH 2.76), left stirring for 1 h, then filtered and rinsed with water (50 mL). The filtrate was lyophilized (for 16 h) and dried under vacuum (0.05 mbar) for 3 h to afford 15.76 g (quant.) of (3-carboxypropanoyl)-L-glutamic acid.

$^1$H-NMR (DMSO-d$_6$): 7.97 (d, J=8.1 Hz, 1H), 4.20-4.12 (m, 1H), 2.47-2.29 (m, 4H), 2.24 (t, J=7.7 Hz, 2H), 1.95-1.85 (m, 1H), 1.81-1.70 (m, 1H).

$^{13}$C-NMR (DMSO-d$_6$): 174.02, 173.80, 173.53, 170.84, 51.53, 30.45, 29.86, 29.17, 26.96.

In a Schlenk tube, previously dried in an oven at 150° C., SOCl$_2$ (20.0 mL, 276 mmol) and 3 drops of DMF were added to (3-carboxypropanoyl)-L-glutamic acid (6.18 g, 25 mmol). The reaction mixture was slowly heated under a flow of nitrogen, which was neutralized through a wash bottle containing an aqueous solution of NaOH (10%). After heating at 60° C. overnight, an aliquot of the reaction mixture (0.2 mL) was pipetted off and placed in a small vial. After evaporating the SOCl$_2$, the sample (63 mg) was analyzed by NMR spectroscopy (purity ca. 90%). The SOCl$_2$ of the rest of the sample was evaporated and the residue dried under vacuum (0.26 mbar) to afford 7.12 g (94%) of the target compound.

$^1$H-NMR (CDCl$_3$): 4.95-4.89 (m, 1H), 3.27 (s, 2H), 3.09-2.93 (m, 2H), 2.87 (s, 2H), 2.64-2.52 (m, 1H), 2.49-2.38 (m, 1H).

$^{13}$C-NMR (CDCl$_3$): 175.66 (2×), 173.12, 170.22, 59.31, 43.18, 41.51, 28.15, 23.89.

(f) Synthesis of a mixture of (4-chloro-4-oxobutanoyl)-L-glutamoyl dichloride (Acyl Chloride 5) and (S)-4-((1,5-dichloro-1,5-dioxopentan-2-yl)amino)-4-oxobutanoic acid (Acyl Chloride 6)

In a Schlenk tube, previously dried in an oven at 150° C., SOCl$_2$ (10.0 mL, 138 mmol) was added to (3-carboxypropanoyl)-L-glutamic acid (1.24 g, 5 mmol). The reaction mixture was stirred under a flow of nitrogen, which was neutralized through a wash bottle containing an aqueous solution of NaOH (10%). After heating at 70° C. overnight, and stirring at room temperature for 9 d, an aliquot of the reaction mixture (0.15 mL) was pipetted off and placed in a small vial. The SOCl$_2$ was evaporated, and the sample (48 mg) analyzed by NMR spectroscopy. The analysis indicated the formation of a mixture of Acyl Chloride 6 and Acyl Chloride 5 in a ratio of ca. 1:1.7 (≈40:60%).

$^1$H-NMR Acyl Chloride 6, CDCl$_3$): 4.94-4.90 (m, 1H), 3.08-2.94 (m, 2H), 3.01 (s, 2H), 2.87 (s, 2H), 2.61-2.54 (m, 1H), 2.47-2.39 (m, 1H).

$^{13}$C-NMR (Acyl Chloride 6, CDCl$_3$): 175.70 (2×), 173.13, 170.22, 59.32, 43.17, 41.51, 28.14, 23.88.

(g) Synthesis of 2,2-bis[(4-chloro-4-oxo-butanoyl)oxymethyl]butyl 4-chloro-4-oxo-butanoate (Acyl Chloride 7)

In a three-necked round bottom flask, 1,1,1-tris-(hydroxymethyl)propane (5.01 g, 37.31 mmol) and triethylamine (30 mL, 215.24 mmol) were dissolved in THF (250 mL) to give a colorless solution. Succinic anhydride (23.49 g, 234.75 mmol) was added and the reaction mixture was stirred at room temperature for 15 h. The solvent was distilled off and ethyl acetate was added to the crude oil. The organic layer was washed with a saturated aqueous solution of NH$_4$Cl (2×), with a saturated aqueous solution of NaCl and dried (MgSO$_4$). After filtration, the solvent was distilled off to afford a brown solid (17.7 g).

$^1$H-NMR (Acetone-d$_6$): 4.07 (s, 6H), 3.06 (m, 6H), 2.62 (m, 12H), 1.53 (q, 2H), 0.89 (t, 3H).

$^{13}$C-NMR (Acetone-d$_6$): 173.81, 172.52, 64.50, 41.70, 29.61, 29.31, 29.15, 23.58, 7.65.

(h) Synthesis of [2-[2,2-bis[(4-chloro-4-oxo-butanoyl)oxymethyl]butoxymethyl]-2-[(4-chloro-4-oxo-butanoyl)oxymethyl]butyl] 4-chloro-4-oxo-butanoate (Acyl Chloride 8)

In a three-necked round bottom flask, 2-[2,2-bis(hydroxymethyl)butoxymethyl]-2-ethyl-propane-1,3-diol (2.01 g, 8.04 mmol) and triethylamine (9 mL, 64.57 mmol) were dissolved in THF (100 mL) to give a colorless solution. Succinic anhydride (6.4 g, 64 mmol) was added, and the reaction mixture stirred at room temperature for 6 h. Then the solvent was distilled off and the residue diluted with ethyl acetate. The organic phase was washed with a saturated aqueous solution of NH$_4$Cl (2×), with a saturated aqueous solution of NaCl and dried (MgSO$_4$). After filtration, the ethyl acetate was distilled off to afford 4-[2-[2,2-bis(3-carboxypropanoyloxymethyl)butoxymethyl]-2-(3-carboxypropanoyloxymethyl)butoxy]-4-oxo-butanoic acid as a solid.

$^1$H-NMR (Acetone-d$_6$): 4.03 (s, 8H), 3.36 (s, 4H), 2.62 (m, 16H), 1.48 (q, 4H), 0.88 (t, 6H).

$^{13}$C-NMR (Acetone-d$_6$): 174.01, 172.50, 71.50, 64.88, 42.53, 29.66, 29.21, 23.67, 7.78.

In a three-necked round bottom flask, 4-[2-[2,2-bis(3-carboxypropanoyloxy-methyl)butoxymethyl]-2-(3-carboxypropanoyloxymethyl)butoxy]-4-oxo-butanoic acid (13.39 g, 20.58 mmol) was dissolved in THF (60 mL). Then SOCl$_2$ (12.01 mL, 164.64 mmol) was added dropwise over the period of 10 min (yellow solution) and the reaction mixture stirred at room temperature for 3 h. The solvent and the excess of SOCl$_2$ were distilled off, and the product was dried with a membrane pump to afford the target compound.

$^1$H-NMR (Acetone-d$_6$): 4.07 (m, 6H), 4.04 (m, 2H), 3.36 (m, 10H), 2.77 (m, 6H), 2.62 (s, 3H), 1.49 (q, 4H), 0.89 (t, 6H).

¹³C-NMR (Acetone-d₆): 173.82, 171.48, 71.42, 65.20, 42.60, 42.52, 29.97, 23.62, 7.73.

(i) Synthesis of 2,2-bis[(2-chlorocarbonylbenzoyl) oxymethyl]butyl 2-chlorocarbonyl-benzoate (Acyl Chloride 9)

In a three-necked round bottom flask, 1,1,1-tris-(hydroxymethyl)propane (5 g, 37.27 mmol) and triethylamine (20.78 mL, 149.06 mmol) were dissolved in THF (250 mL) to give a colorless solution. The reaction mixture was cooled to 5° C. with a cold water bath. Phthalic anhydride (17.11 g, 115.53 mmol) was added, and the reaction mixture was stirred for 15 minutes while warming to room temperature. The solvent was distilled off, and a saturated aqueous solution of NaHCO₃ was added. Diethyl ether was added, and the organic layer was removed. An aqueous solution of HCl (10%) was added to the aqueous phase to obtain a pH of 3. A white solid precipitated and was filtered off. The solid was dissolved in acetone and the solution was dried with (MgSO₄) before the solvent was distilled off to afford 21.16 g of 2-[2,2-bis[(2-carboxybenzoyl)oxymethyl]butoxycarbonyl] benzoic acid as a white solid.

¹H-NMR (Acetone-d₆): 7.81 (m, 3H), 7.68 (m, 3H), 7.58 (m, 6H), 4.36 (s, 6H), 1.62 (q, 2H), 0.97 (t, 3H).

¹³C-NMR (Acetone-d₆): 169.79, 168.60, 134.39, 133.65, 131.63, 131.61, 129.80, 129.31, 65.69, 41.75, 23.57, 7.69.

In a three-necked round bottom flask, 2-[2,2-bis[(2-carboxybenzoyl)oxymethyl]butoxycarbonyl]benzoic acid (19.56 g, 33.82 mmol) and SOCl₂ (100 mL, 1370.9 mmol) were mixed to give a yellow solution. The reaction mixture was stirred for 4 h. Then the SOCl₂ was distilled off, and the crude product was dried under vacuum overnight to afford an orange oil.

¹H-NMR (Acetone-d₆): 7.98 (m, 3H), 7.86 (m, 3H), 7.81 (m, 3H), 7.74 (m, 3H), 4.54 (s, 6H), 1.78 (q, 2H), 1.08 (t, 3H).

¹³C-NMR (Acetone-d₆): 168.80, 166.04, 137.75, 133.55, 133.50, 130.80, 129.87, 129.05, 66.37, 42.22, 23.78, 7.68.

(j) Synthesis of [2-[2,2-bis[(2-chlorocarbonylbenzoyl)oxymethyl]butoxymethyl]-2-[(2-chlorocarbonylbenzoyl)oxymethyl]butyl] 2-chlorocarbonylbenzoate (Acyl Chloride 10)

In a three-necked round bottom flask, 2-[2,2-bis(hydroxymethyl)butoxymethyl]-2-ethyl-propane-1,3-diol (2.01 g, 8.02 mmol) and triethylamine (5.8 mL, 41.61 mmol) were dissolved in THF (75 mL). The solution was cooled to 5° C. with a cold water bath. Phthalic anhydride (5 g, 33.75 mmol) was added, and the reaction mixture stirred for 15 h while warming to room temperature. The solvent was distilled off and diethyl ether was added. Deionized water was added, and the organic layer was removed. An aqueous solution of HCl (10%) was added to the aqueous phase to obtain a pH of 4. A white solid precipitated, which was filtered off, dissolved in acetone and dried (MgSO₄). Then the solvent was distilled off to afford 6.3 g of 2-[2-[2,2-bis[(2-carboxybenzoyl)oxymethyl]butoxymethyl]-2-[(2-carboxybenzoyl) oxymethyl]butoxy] carbonylbenzoic acid as a white solid.

¹H-NMR (Acetone-d₆): 7.79 (m, 4H), 7.68 (m, 4H), 7.58 (m, 8H), 4.31 (s, 8H), 3.51 (s, 4H), 1.57 (q, 4H), 0.91 (t, 6H).

¹³C-NMR (Acetone-d₆): 169.46, 168.39, 133.78, 133.64, 131.84, 131.68, 129.75, 129.50, 71.64, 66.38, 42.62, 23.85, 7.90.

In a three-necked round bottom flask, 2-[2-[2,2-bis[(2-carboxybenzoyl)oxymethyl]butoxymethyl]-2-[(2-carboxybenzoyl)oxymethyl]butoxy]carbonylbenzoic acid (20.2 g, 23.52 mmol) and SOCl₂ (100 mL, 1370.9 mmol) were mixed to give a yellow solution. DMF (50 mg) was added, and the reaction mixture stirred for 15 h. Then the SOCl₂ was distilled off to afford an orange oil, which was dried under vacuum overnight.

¹H-NMR (Acetone-d₆): 7.94 (m, 4H), 7.83 (m, 4H), 7.78 (m, 4H), 7.71 (m, 4H), 4.42 (s, 8H), 3.61 (s, 4H), 1.66 (q, 4H), 0.98 (t, 6H).

¹³C-NMR (Acetone-d₆): 133.45, 133.38, 130.77, 129.90, 128.88, 71.49, 66.68, 42.90, 23.71, 7.77.

(k) Synthesis of 4-(2,4,5-trichlorocarbonylbenzoyl)oxybutyl 2,4,5-trichlorocarbonyl-benzoate (Acyl Chloride 11)

In a three-necked round bottom flask, 2,2,4,5-benzenetetracarboxylic anhydride (4.93 g, 22.6 mmol) and triethylamine (8 mL, 57.4 mmol) were dissolved in THF (150 mL) to give an orange solution. A solution of 1,4-butanediol (1 mL, 11.28 mmol) in THF (20 mL) was added dropwise. The reaction mixture was stirred at room temperature for 4 h. Then, the solvent was distilled off to yield a solid. Acetone (25 mL) was added, and the suspension was stirred for 15 h. A saturated aqueous solution of NaHCO₃(100 mL) was added, and the reaction mixture stirred until complete dissolution of the solid. The solution was washed with ethyl acetate (100 mL). The organic layer was eliminated, and the pH of the aqueous phase was adjusted to 3 with an aqueous solution of HCl (10%). A white, viscous oil phase separated. Water was removed, and the precipitate was washed with water, dissolved in acetone, dried (MgSO₄), and filtered. The solvent was distilled off to afford 6.2 g of 5-[4-(2,4,5-tricarboxybenzoyl)oxybutoxycarbonyl]benzene-1,2,4-tricarboxylic acid as a white solid.

¹H-NMR (Acetone-d₆): 8.03 (s, 2H), 7.94 (s, 2H), 4.32 (m, 4H), 1.82 (m, 4H).

¹³C-NMR (Acetone-d₆): 167.14, 166.99, 166.62, 166.21, 135.23, 134.56, 134.12, 133.70, 128.90, 128.26, 65.14, 24.41.

In a three-necked round bottom flask, 5-[4-(2,4,5-tricarboxybenzoyl)oxybutoxycarbonyl]benzene-1,2,4-tricarboxylic acid (5.52 g, 9.81 mmol), SOCl₂ (50 mL, 236.4 mmol), DMF (0.05 g, 0.68 mmol) were mixed to give an orange solution. The reaction mixture was stirred at 80° C. for 24 h. Then the SOCl₂ was distilled off to afford an orange oil.

¹H-NMR (Acetone-d₆): 8.35-7.90 (m, 4H, mixture of isomers), 4.33 (m, 4H), 1.83 (m, 4H).

¹³C-NMR (Acetone-d₆): 167.04, 166.91, 166.52, 166.22, 135.17, 134.52, 134.22, 133.74, 128.92, 128.29, 65.23, 24.51.

Example 2

Preparation of Polyamide Microcapsules a Using a Colloidal Stabilizer in the Oil Phase and Acyl Chlorides of Formula (I)

Perfume oils 1 and 2 were prepared by mixing the ingredients listed in Tables 1 and 2.

TABLE 1

Composition of Perfume oil 1.

| Ingredients | % |
| --- | --- |
| 2,4-Dimethyl-3-cyclohexene-1-carbaldehyde | 3.30 |
| Allyl heptanoate | 5.50 |
| Allyl (2- and 3-methylbutoxy) acetate | 10.99 |
| Delta-Damascone | 1.65 |
| Tricyclo[5.2.1.0-2,6-]dec-3- and 4-en-8-yl acetate | 20.30 |
| Hediione ®[1] | 4.95 |
| Iso E Super ®[2] | 16.49 |
| Hexylcinnamic aldehyde | 9.89 |
| Ethyl 2-methylpentanoate | 3.30 |
| Lilial ®[3] | 21.98 |
| (3Z)-3-Hexen-1-yl butyrate | 1.10 |
| Ambrox ®[4] | 0.55 |
| Total | 100 |

[1] Methyl dihydrojasmonate, origin: Firmenich SA, Geneva, Switzerland
[2] 1-(Octahydro-2,3,8,8-tetramethyl-2-naphtalenyl)-1-ethanone, origin: International Flavors & Fragrances, USA
[3] 2-Methyl-3-[4-(2-methyl-2-propanyl)phenyl]propanal, origin: Givaudan SA, Geneva, Switzerland
[4] (−)-(8R)-8,12-Epoxy-13,14,15,16-tetranorlabdane, origin: Firmenich SA, Geneva, Switzerland

TABLE 2

Composition of Perfume oil 2.

| Ingredients | % |
| --- | --- |
| Ethyl 2-methylpentanoate | 3.20 |
| Eucalyptol | 7.80 |
| Decanal | 0.75 |
| 2,4-Dimethyl-3-cyclohexene-1-carbaldehyde[1] | 0.75 |
| Citronellyl nitrile | 4.30 |
| Isobornyl acetate | 3.00 |
| Verdox ®[2] | 9.80 |
| Citronellyl acetate | 1.30 |
| 2-Methylundecanal | 3.00 |
| Diphenyloxide | 0.80 |
| Dodecanal | 1.30 |
| Dicyclopentadiene acetate | 9.85 |
| Beta-Ionone | 3.30 |
| Gamma-Undecalactone | 18.75 |
| Hexylsalicylate | 15.90 |
| Benzylsalicylate | 16.20 |
| Total | 100 |

[1] Origin: Firmenich SA, Geneva, Switzerland
[2] 2-tert-Butyl-1-cyclohexyl acetate, origin: International Flavors & Fragrances, USA An acyl chloride of formula (I) according to the invention (20 mmol, Table 3) was dissolved in benzyl benzoate (5 g). Sodium caseinate (2 g) was dispersed in benzyl benzoate (5 g) and optionally maintained at 60° C. under stirring for one hour. Both solutions were mixed together, stirred at room temperature for 10 min, and then added to a perfume oil (25 g, Table 1 or Table 2) at room temperature to form an oil phase. The oil phase was mixed with a solution of L-lysine (2.5 g) in water (95 g). The reaction mixture was stirred with an Ultra Turrax® at 24'000 rpm for 5 min to afford an emulsion. Ethylene diamine (0.24 g) was dissolved in water (5 g) and this solution was added dropwise to the emulsion. The reaction mixture was stirred at 30° C. for 4 h to afford a white dispersion.

TABLE 3

Compositions of polyamide microcapsules A.

| Capsules | Acyl chloride | (g) |
| --- | --- | --- |
| A1 | 2 (Example 1b) | 1.70 |
| A2 | 4 (Example 1d) | 2.14 |
| A3 | 7 (Example 1g) | 3.26 |
| A4 | 8 (Example 1h) | 3.58 |
| A5 | 9 (Example 1i) | 8.89 |
| A6 | 10 (Example 1j) | 4.32 |
| A7 | 11 (Example 1k) | 2.22 |

Example 3

Preparation of Polyamide Microcapsules B Using a Colloidal Stabilizer in the Oil Phase and a Mixture of 1,3,5-Benzene Tricarbonyle Chloride and Acyl Chlorides of Formula (I)

Polyamide microcapsules B were prepared according to the protocol used for polyamide microcapsules A (Example 2). Acyl chlorides of formula (I) according to the invention and 1,3,5-benzene tricarbonyle chloride (with a total of 20 mmol of acid chloride functions) were dissolved in benzyl benzoate (5 g). The compositions of mixtures of acid chlorides are listed in Table 4.

TABLE 4

Compositions of polyamide microcapsules B.

| Capsules | 1,3,5-benzene tricarbonyle chloride (g) | Acyl chloride | (g) |
| --- | --- | --- | --- |
| B1 | 0.50 | 3 (Example 1c) | 1.47 |
| B2 | 0.89 | 3 (Example 1c) | 1.04 |
| B3 | 1.32 | 3 (Example 1c) | 0.48 |
| B4 | 0.44 | 5 (Example 1e) | 1.49 |
| B5 | 0.86 | 5 (Example 1e) | 0.96 |
| B6 | 1.60 | 5 (Example 1e) | 0.51 |
| B7 | 0.46 | 7 (Example 1g) | 2.46 |
| B8 | 0.87 | 7 (Example 1g) | 1.63 |
| B9 | 1.34 | 7 (Example 1g) | 0.85 |
| B10 | 0.43 | 8 (Example 1h) | 2.70 |
| B11 | 0.90 | 8 (Example 1h) | 1.79 |
| B12 | 1.31 | 8 (Example 1h) | 0.93 |

Example 4

Storage Stability of Microcapsules in a Fabric Softener Composition

The storage stability of the capsules was evaluated in fabric softener formulation. Dispersions of polyamide microcapsules (0.27 g) according to the present invention (with encapsulated perfume oil 2, Table 2) was diluted with the fabric softener composition described in Table 5 (29.73 g). The softener was stored for up to one month at 37° C. The amount of perfume that leaked out of the capsules was then measured by solvent extraction and GC-FID analysis (Table 6).

TABLE 5

Fabric Softener composition.

| Product | Wt % |
|---|---|
| Stepantex ® VL 90A | 8.88 |
| Calcium chloride sol. 10% | 0.36 |
| Proxel ® GXL | 0.04 |
| Perfume oil 2 | 1.00 |
| Water | 89.72 |
| TOTAL | 100 |

TABLE 6

Oil leakage of microcapsules in fabric softener composition.

| Capsules | Leakage 3 days (%) |
|---|---|
| B2 | 20 |
| B3 | 10 |

The data in Table 6 demonstrates that the microcapsules according to the present invention show a satisfactory stability in challenging application formulations, such as a fabric softener.

Example 4

Liquid Detergent Composition

Microcapsules A1-A7 and B1-B12 of the present invention are dispersed in a liquid detergent base described in Table 7 to obtain a concentration of encapsulated perfume oil at 0.22%.

TABLE 7

Liquid detergent composition

| Ingredients | Concentration [wt %] |
|---|---|
| Sodium C14-17 Alkyl Sec Sulfonate[1] | 7 |
| Fatty acids, C12-18 and C18-unsaturated[2] | 7.5 |
| C12/14 fatty alcohol poly glycol ether with 7 mol EO[3] | 17 |
| Triethanolamine | 7.5 |
| Propylene Glycol | 11 |
| Citric acid | 6.5 |
| Potassium Hydroxyde | 9.5 |
| Protease | 0.2 |
| Amylase | 0.2 |
| Mannanase | 0.2 |
| Acrylates/Steareth-20 Methacrylate structuring Crosspolymer[4] | 6 |
| Deionized Water | 27.4 |

[1] Hostapur ® SAS 60; Origin: Clariant
[2] Edenor ® K 12-18; Origin: Cognis
[3] Genapol ® LA 070; Origin: Clariant
[4] Aculyn ® 88; Origin: Dow Chemical Example 5

Rinse-Off Conditioner

Microcapsules A1-A7 and B1-B12 of the present invention are dispersed in a rinse-off conditioner base described in Table 8 to obtain a concentration of encapsulated perfume oil at 0.5%.

TABLE 8

Rinse-off conditioner composition

| | Ingredients | Concentration [wt %] |
|---|---|---|
| A | Water deionized | 81.8 |
| | Behentrimonium Chloride [1] | 2.5 |
| | Hydroxyethylcellulose [2] | 1.5 |
| B | Cetearyl Alcohol [3] | 4 |
| | Glyceryl Stearate (and) PEG-100 Stearate [4] | 2 |
| | Behentrimonium Methosulfate (and) Cetyl alcohol (and) Butylene Glycol [5] | 4 |
| | Ethoxy (20) Stearyl Alcohol [6] | 1 |
| C | Amodimethicone (and) Trideceth-12 (and) Cetrimonium Chloride [7] | 3 |
| | Chlorhexidine Digluconate [8] 20% aqueous solution | 0.2 |
| D | Citric acid 10% aqueous sol. till pH 3.5-4 | q.s. |
| | TOTAL: | 100 |

[1] Genamin KDM P, Clariant
[2] Tylose H10 Y G4, Shin Etsu
[3] Lanette O, BASF
[4] Arlacel 165-FP-MBAL-PA-(RB), Croda
[5] Incroquat Behenyl TMS-50-MBAL-PA-(MH) HA4112, Croda
[6] SP Brij S20 MBAL-PA(RB), Croda
[7] Xiameter DC MEM-0949 Emulsion, Dow Corning
[8] Alfa Aesar Example 6

Shampoo Composition

Microcapsules A1-A7 and B1-B12 of the present invention are weighed and mixed in a shampoo composition to add the equivalent of 0.2% perfume (Table 9).

TABLE 9

Shampoo composition

| | Ingredients | Concentration [wt %] |
|---|---|---|
| A | Water deionized | 44.4 |
| | Polyquaternium-10 [1] | 0.3 |
| | Glycerin 85% [2] | 1 |
| | DMDM Hydantoin [3] | 0.2 |
| B | Sodium Laureth Sulfate [4] | 28 |
| | Cocamidopropyl Betaine [5] | 3.2 |
| | Disodium Cocoamphodiacetate [6] | 4 |
| | Ethoxy (20) Stearyl Alcohol [6] | 1 |
| C | Sodium Laureth Sulfate [4] | 3 |
| | Glyceryl Laureate [7] | 0.2 |
| D | Water deionized | 1 |
| | Sodium Methylparaben [8] | 0.1 |
| E | Sodium Chloride 10% aqueous sol. | 15 |
| | Citric acid 10% aqueous sol. till pH 5.5-6 | q.s. |
| | Perfume | 0.5 |
| | TOTAL: | 100 |

[1] Ucare Polymer JR-400, Noveon
[2] Schweizerhall
[3] Glydant, Lonza
[4] Texapon NSO IS, Cognis
[5] Tego Betain F 50, Evonik
[6] Amphotensid GB 2009, Zschimmer & Schwarz
[7] Monomuls 90 L-12, Gruenau
[8] Nipagin Monosodium, NIPA

Example 7

Antiperspirant Roll-on Emulsion Composition

Microcapsules A1-A7 and B1-B12 of the present invention are weighed and mixed in antiperspirant roll-on emulsion composition to add the equivalent of 0.2% perfume (Table 10).

TABLE 10

Antiperspirant roll-on emulsion composition

| Ingredient | Amount (wt %) |
|---|---|
| Steareth-2[1] (Part A) | 3.25 |
| Steareth-21[2] (Part A) | 0.75 |
| PPG-15 Stearyl Ether[3] (Part A) | 4 |
| WATER deionised (Part B) | 51 |
| Aluminum Chlorohydrate 50% aqueous solution[4] (Part C) | 40 |
| Fragrance (Part D) | 1 |

[1] BRIJ 72; origin: ICI
[2] BRIJ 721; origin: ICI
[3] ARLAMOL E; origin: UNIQEMA-CRODA
[4] LOCRON L; origin: CLARIAN Part A and B are heated separately to 75° C.; Part A is added to Part B under stirring and the mixture is homogenized for 10 min. Then, the mixture is cooled under stirring; and Part C is slowly added when the mixture reached 45° C. and Part D when the mixture reached at 35° C. while stirring. Then the mixture is cooled to room temperature.

Example 8

Deodorant Spray Composition

Microcapsules A1-A7 and B1-B12 of the present invention are weighed and mixed in antiperspirant roll-on emulsion composition to add the equivalent of 0.2% perfume (Table 11).

TABLE 11

Deodorant spray composition

| Ingredient | Amount (wt %) |
|---|---|
| Ethanol 95% | 90.65 |
| Triclosan[1] | 0.26 |
| Isopropyl miristate | 9.09 |

[1] Irgasan ® DP 300; trademark and origin: BASF

All the ingredients according to the sequence of Table 11 are mixed and dissolved. Then the aerosol cans are filled, crimp and the propellant is added (Aerosol filling: 40% active solution 60% Propane/Butane 2.5 bar).

Example 9

Shower-Gel Composition

Microcapsules A1-A7 and B1-B12 of the present invention are weighed and mixed in the following composition to add the equivalent of 0.2% perfume (Table 12).

TABLE 12

Shower gel composition

| Ingredients | Amount (% wt) | Function |
|---|---|---|
| WATER deionized | 49.350 | Solvent |
| Tetrasodium EDTA [1] | 0.050 | Chelating agent |
| Acrylates Copolymer[2] | 6.000 | Thickener |
| Sodium C12-C15 Pareth Sulfate [3] | 35.000 | Surfactant |
| Sodium Hydroxide 20% aqueous solution | 1.000 | pH adjuster |
| Cocamidopropyl Betaine[4] | 8.000 | Surfactant |
| Methylchloroisothiazolinone and Methylisothiazolinone[5] | 0.100 | Preservative |
| Citric Acid (40%) | 0.500 | pH adjuster |

[1] EDETA B POWDER; trademark and origin: BASF
[2] CARBOPOL AQUA SF-1 POLYMER; trademark and origin: NOVEON
[3] ZETESOL AO 328 U; trademark and origin: ZSCHIMMER & SCHWARZ
[4] TEGO-BETAIN F 50; trademark and origin: GOLDSCHMIDT
[5] KATHON CG; trademark and origin: ROHM & HASS

The invention claimed is:

1. A polyamide core-shell microcapsule comprising:
an oil-based core comprising a hydrophobic material, and
a polyamide shell comprising:
 at least one acyl chloride,
 at least one amino compound,
wherein the acyl chloride has the following formula (I)

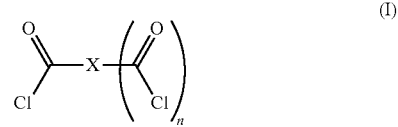

wherein n is an integer varying between 1 and 8, and
wherein X is either an (n+1)-valent $C_3$ to $C_6$ alkyl group, or an (n+1)-valent $C_2$ to $C_{45}$ hydrocarbon group comprising at least one group selected from (i) to (vi), (i)

(ii)

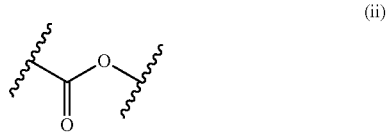

(iii)

(iv)

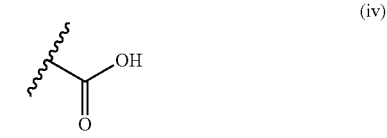

(v)

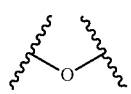

wherein R is a hydrogen atom or a methyl or ethyl group, with the proviso that cyclohexane-1,3,5-tricarbonyl trichloride and 2,2'-oxydiacetyl chloride are excluded; and wherein the amino compound comprises an amino acid.

2. The microcapsule according to claim 1, wherein the acyl chloride is chosen from the group consisting of propane-1,2,3-tricarbonyl trichloride, cyclohexane-1,2,4,5-tetracarbonyl tetrachloride, 2,2'-disulfanediyldisuccinyl dichloride, 2-(2-chloro-2-oxo-ethyl) sulfanylbutanedioyl dichloride, (4-chloro-4-oxobutanoyl)-L-glutamoyl dichloride, (S)-4-((1,5-dichloro-1,5-dioxopentan-2-yl)amino)-4-oxobutanoic acid, 2,2-bis[(4-chloro-4-oxo-butanoyl)oxymethyl]butyl 4-chloro-4-oxo-butanoate, [2-[2,2-bis[(4-chloro-4-oxo-butanoyl)oxymethyl]butoxymethyl]-2-[(4-chloro-4-oxo-butanoyl)oxymethyl]butyl] 4-chloro-4-oxo-butanoate, 2,2-bis[(2-chlorocarbonylbenzoyl)oxymethyl]butyl 2-chlorocarbonyl-benzoate, [2-[2,2-bis[(2-chlorocarbonylbenzoyl)oxymethyl]butoxymethyl]-2-[(2-chlorocarbonylbenzoyl)oxymethyl]butyl] 2-chlorocarbonylbenzoate, 4-(2,4,5-trichlorocarbonylbenzoyl)oxybutyl 2,4,5-trichlorocarbonylbenzoate, and mixtures thereof.

3. The microcapsule according to claim 1, wherein the amino-compound is chosen from the group consisting of L-Lysine, L-Arginine, L-Histidine, L-Tryptophan, L-Serine, L-Glutamine, L-Threonine, and mixtures thereof.

4. The microcapsule according to claim 1, wherein the shell comprises a first amino-compound and a second amino-compound.

5. The microcapsule according to claim 4, wherein the first amino-compound is chosen from the group consisting of L-Lysine, L-Arginine, L-Histidine, L-Tryptophan, L-Serine, L-Glutamine, and mixtures thereof.

6. The microcapsule according to claim 4, wherein the second amino-compound is chosen from the group consisting of xylylene diamine, 1,2-diaminocyclohexane, 1,4-diaminocyclohexane, L-lysine, L-Lysine ethyl ester, polyetheramines (Jeffamine®), ethylene diamine, diethylene triamine, spermine, spermidine, polyamidoamine (PAMAM), guanidine carbonate, chitosan, tris-(2-aminoethyl) amine, 3-aminopropyltriethoxysilane, L-arginine, an amine having a disulfide bond such as cystamine, cystamine hydrochloride, cystine, cystine hydrochloride, cystine dialkyl ester, cystine dialkyl ester hydrochloride and mixtures thereof.

7. The microcapsule according to claim 1, wherein the weight ratio between acyl chloride and the hydrophobic material is comprised between 0.01 and 0.2.

8. The microcapsule according to claim 1, wherein the molar ratio between the functional group $NH_2$ of the amino compound and the functional group $COCl$ of the acyl chloride is comprised between 0.01 and 50.

9. The microcapsule according to claim 1, wherein the microcapsule comprises an outer cationic coating.

10. A process for preparing a core-shell polyamide microcapsule slurry comprising the following steps:
a) Dissolving at least one acyl chloride in a hydrophobic material to form an oil phase;
b) Dispersing the oil phase obtained in step a) into a water phase to obtain an oil-in-water emulsion;
c) Performing a curing step to form polyamide microcapsules in the form of a slurry;

wherein a stabilizer is added to the oil phase and/or to the water phase, and wherein at least one amino-compound is added to the water phase before the formation of the oil-in-water emulsion and/or in the oil-in water emulsion obtained after step b)

wherein the acyl chloride has the following formula (I)

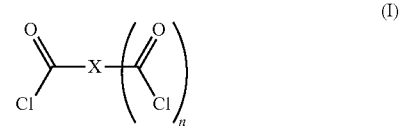

wherein n is an integer varying between 1 and 8, and wherein X is either an (n+1)-valent $C_3$ to $C_6$ alkyl group, or an (n+1)-valent $C_2$ to $C_{45}$ hydrocarbon group comprising at least one group selected from (i) to (vi),

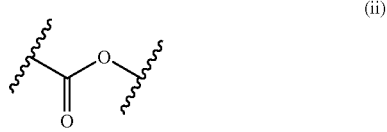

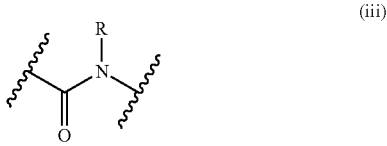

wherein R is a hydrogen atom or a methyl or ethyl group, with the proviso that cyclohexane-1,3,5-tricarbonyl trichloride and 2,2'-oxydiacetyl chloride are excluded; and wherein the amino compound comprises an amino acid.

11. The process according to claim 10, wherein a first amino compound is added to the water phase and wherein a second amino compound is added to the oil-in-water emulsion.

12. The process according to claim 10, wherein the stabilizer is chosen from the group consisting of gum Arabic, modified starch, polyvinyl alcohol, polyvinylpyrolidone (PVP), carboxymethylcellulose (CMC), anionic polysaccharides, acrylamide copolymer, inorganic particles, protein such as soy protein, rice protein, whey protein, white egg albumin, sodium caseinate, gelatin, bovine serum albumin, hydrolyzed soy protein, hydrolyzed sericin, pseudocollagen, silk protein, sericin powder, and mixtures thereof.

13. A perfuming composition comprising
  (i) Perfume microcapsule as defined in claim 1, wherein the hydrophobic material comprises a perfume,
  (ii) At least one ingredient selected from the group consisting of a perfumery carrier and a perfumery base
  (iii) Optionally at least one perfumery adjuvant.

14. A consumer product comprising:
a personal care active base, and
microcapsules as defined in claim 1,
wherein the consumer product is in the form of a personal care composition.

15. A consumer product comprising:
a home care or a fabric care active base, and
microcapsules as defined in claim 1,
wherein the consumer product is in the form of a home care or a fabric care composition.

16. The microcapsule according to claim 1, wherein the hydrophobic material is a perfume.

17. The microcapsule according to claim 1, wherein:
n is an integer varying between 1 and 4; and
R is a hydrogen atom.

18. The process according to claim 10, wherein the hydrophobic material is a perfume.

19. The process according to claim 10, wherein:
n is an integer varying between 1 and 4; and
R is a hydrogen atom.

* * * * *